(12) United States Patent
Devanagondi et al.

(10) Patent No.: US 7,486,678 B1
(45) Date of Patent: Feb. 3, 2009

(54) MULTI-SLICE NETWORK PROCESSOR

(75) Inventors: Harish R. Devanagondi, Saratoga, CA (US); Harish P. Belur, Saratoga, CA (US); Brian A. Petersen, San Francisco, CA (US); Richard J. Heaton, San Jose, CA (US); Majid Torabi, Los Altos Hills, CA (US)

(73) Assignee: Greenfield Networks

( * ) Notice: Subject to any disclaimer, the term of this patent is extended or adjusted under 35 U.S.C. 154(b) by 1032 days.

(21) Appl. No.: 10/612,889

(22) Filed: Jul. 3, 2003

Related U.S. Application Data

(60) Provisional application No. 60/425,227, filed on Nov. 7, 2002, provisional application No. 60/393,628, filed on Jul. 3, 2002.

(51) Int. Cl.
*H04L 12/28* (2006.01)
*H04L 12/56* (2006.01)
*H04L 12/54* (2006.01)

(52) U.S. Cl. .................... 370/394; 370/395.1; 370/396; 370/429

(58) Field of Classification Search ................. 370/230, 370/389, 229, 429, 394, 395.1, 396
See application file for complete search history.

(56) References Cited

U.S. PATENT DOCUMENTS

| | | | | |
|---|---|---|---|---|
| 6,724,767 B1 * | 4/2004 | Chong et al. | ................ | 370/412 |
| 6,907,001 B1 * | 6/2005 | Nakayama et al. | .......... | 370/230 |
| 6,977,930 B1 * | 12/2005 | Epps et al. | .................. | 370/392 |
| 7,010,004 B2 * | 3/2006 | Gazit | .......................... | 370/537 |
| 7,016,352 B1 * | 3/2006 | Chow et al. | ................. | 370/392 |
| 7,016,367 B1 * | 3/2006 | Dyckerhoff et al. | ......... | 370/429 |

OTHER PUBLICATIONS

IETF RFC 3031, "MPLS Architecture", Jan. 2001.*

* cited by examiner

*Primary Examiner*—Seema S Rao
*Assistant Examiner*—Jianye Wu
(74) *Attorney, Agent, or Firm*—Tucker Ellis & West LLP

(57) ABSTRACT

A multi-slice network processor processes a packet in packet slices for transfer over a multi-port network interface such as a switch fabric. The network processor segments a packet into cells having a target size. A group of cells of a common packet form a packet slice which is independently processed by one of a number of parallel processing and storage slices. Load balancing may be used in the selection of processing slices. Furthermore, the network processor may load balance slices across the multi-port network interface to one or more destination slices of another network processor. The multi-slice processor uses post header storage delivery on ingress processing to the multi-port interface thereby reducing temporary storage requirements. The multi-slice network processor may also utilize sequence numbers associated with each packet to ensure that prior to transmission onto a destination network, the packet is in the correct order for a communication flow.

13 Claims, 18 Drawing Sheets

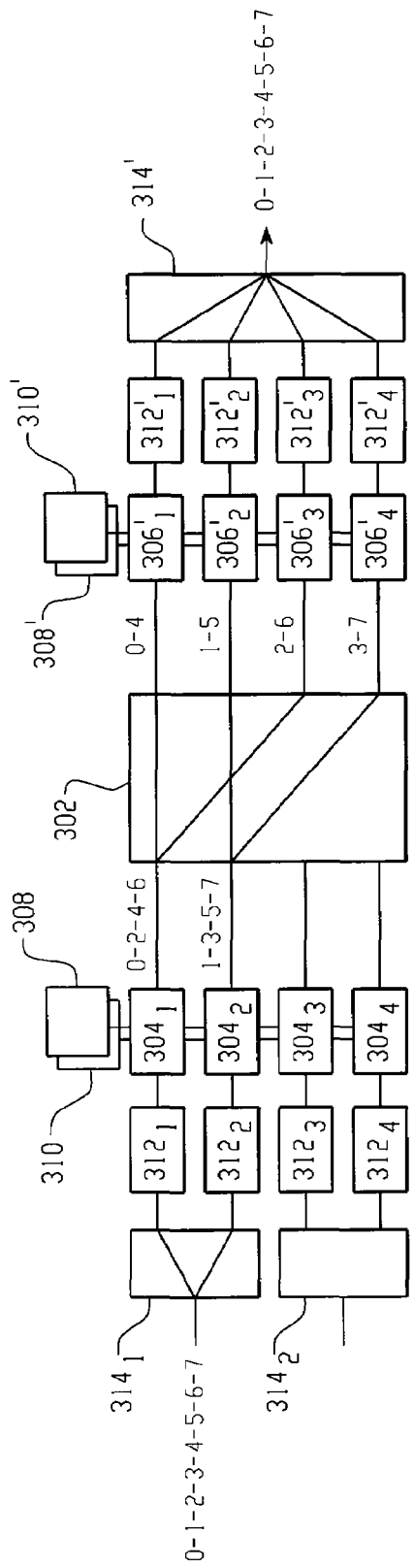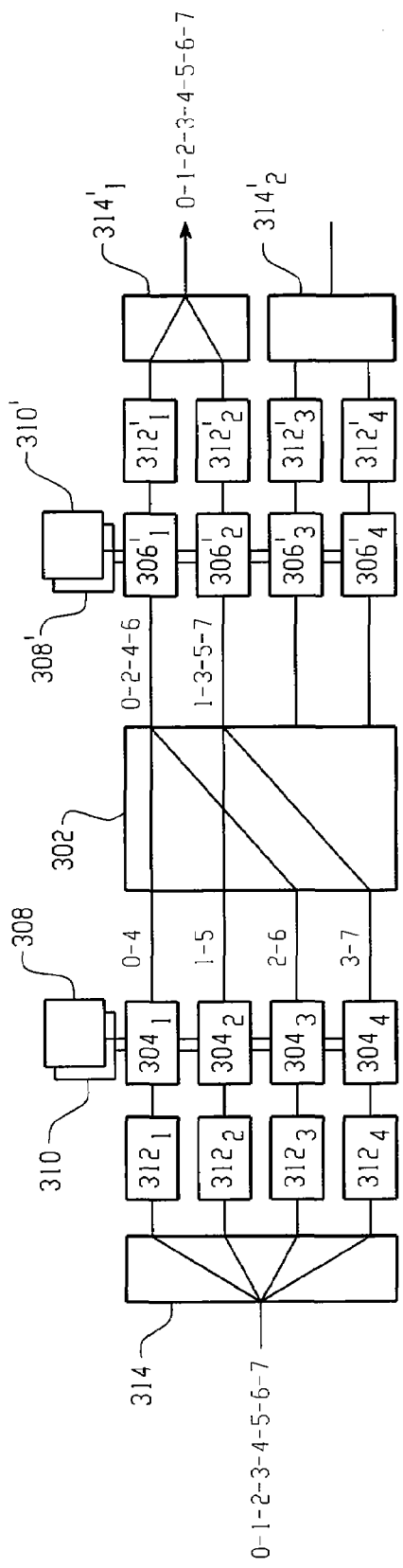
Fig. 9E
Fig. 9F

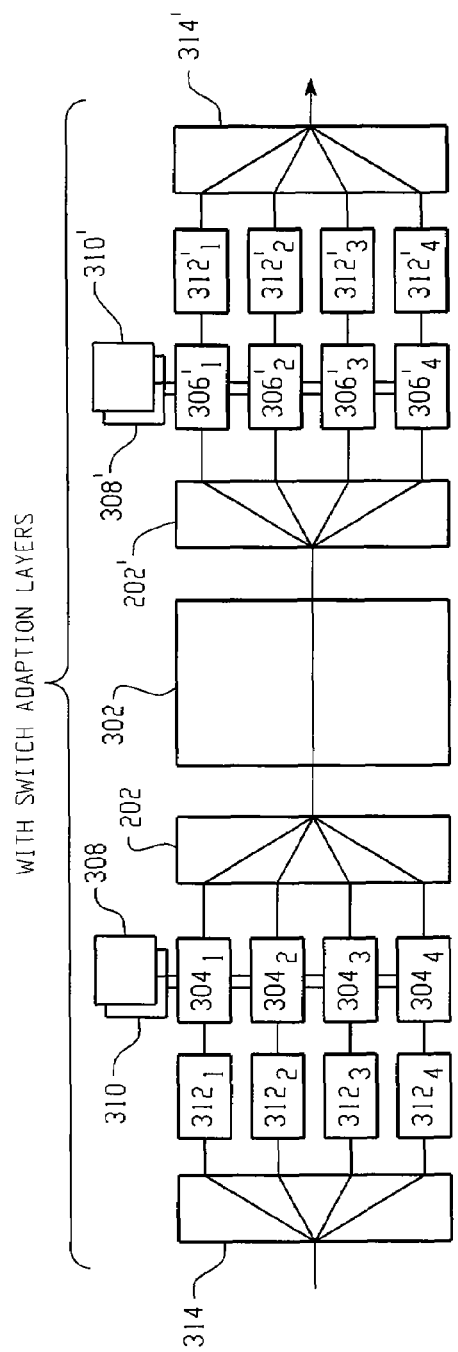
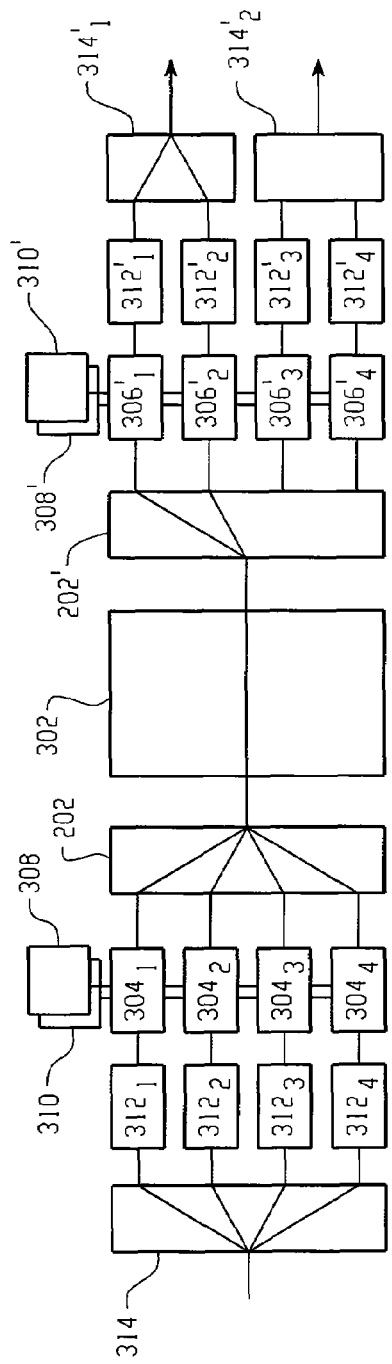
Fig. 9G
Fig. 9H

MULTI-SLICE NETWORK PROCESSOR

CROSS-REFERENCE TO RELATED APPLICATIONS

This application claims the benefit of priority under 35 U.S.C. § 119(e) to U.S. provisional patent application No. 60/393,628, filed on Jul. 3, 2002, entitled "Multi-Slice Network Processor" having inventors Harish R. Devanagondi, Harish P. Belur, Brian A. Petersen, Richard J. Heaton and Majid Torabi, which is hereby incorporated by reference.

This application claims the benefit of priority under 35 U.S.C. § 119(e) to U.S. provisional patent application No. 60/425,227, filed on Nov. 7, 2002, entitled "Multi-Slice Network Processor" having inventors Harish R. Devanagondi, Harish P. Belur, Brian A. Petersen, Richard J. Heaton and Majid Torabi, which is hereby incorporated by reference.

BACKGROUND

1. Field of Invention

The present invention relates to parallel packet processing in networks.

2. Description of the Background Art

The bandwidth of data networks is increasing at a rate that far exceeds the rate of increase of processor performance. Coupled with this disparity is the demand for an increasingly rich set of functionality that must be applied to each network data packet processed by a switch or router. Hence, the workload of a network processor increases as the product of these two dimensions.

Furthermore, a network processor may be supporting networks which are themselves channelized and may also be supporting multiple lower-bandwidth network connections. As part of the network interface, channelization allows the multiplexing of several lower-bandwidth network links across a single physical media connection. For example, a single OC-768 connection may convey 64 OC-12 connections, each operating independently of the others.

Communication packet lengths may be highly variable. Typically, a range of lengths from 40 bytes through 16 Kbytes may be expected. Load balancing algorithms generally perform poorly with highly variable packet lengths unless significant temporary buffering and excess interface bandwidth is provided to accommodate the largest packet size.

An important issue in parallel processing slice architectures is that of load balancing. As long as each slice is kept fully utilized, the performance benefit of each slice is linearly additive. Flaws or inefficiencies in the load balancing algorithm may cause temporal gaps to appear between packets. When such load balancing gaps appear, the performance effect of each additional packet processing slice is less than linearly additive and may even degrade overall performance as the load balancing algorithm breaks down further.

Load balancing has the effect of distributing packets somewhat arbitrarily among the processing slices. When the lengths of the packets are so short that their transfer time (packet length divided by bit rate) drops below the variability of the processing latency from slice to slice, it is possible for packets, to emerge from the processing stage of the slices in an order different than the one in which they were received from the source network interface. If the packets are then queued in the order in which they emerge from processing, erroneous reordering of the packets will result.

SUMMARY OF THE INVENTION

The present invention provides one or more embodiments of a multi-slice network processor system for processing a packet in packet slices for transfer over a network interface. In one embodiment in accordance with the present invention, the system comprises a plurality of parallel processing slices, a network data distribution and aggregation module communicatively coupled to each processing slice, and a queuing module. Each processing slice comprises a lookup processing module and access to a storage sub-system. In one example, the storage sub-system includes a buffer memory, the memory storing at least one group of cells of a packet in a buffer; and a buffer manager, the buffer manager maintaining a buffer correlation data structure for correlating one or more buffers of the same packet slice, the buffer correlation data structure being stored in the buffer memory.

The network module segments a packet received from a network into smaller subdivisions of data, hereafter called cells, and distributes one or more cells as a packet slice to one or more of the processing slices. Load balancing may be used in, the assignment of cells to processing slices.

The queuing module is also communicatively coupled to each of the processing slices for coordinating enqueuing and dequeuing of each packet slice in each processing slice. The queuing module controls the enqueuing and dequeuing of each of the packet slices. In one embodiment, each of the plurality of slices has a channel communication interface with the network interface over which each packet slice is directed to a destination processing slice across the network interface. In one example, the network interface is a switch fabric, and the channel communication interface includes a port connection with the switch fabric. The queuing module includes a queuing memory space. In one example, the queuing module maintains a slice correlation data structure for correlating one or more slices of the same packet in a single queue entry, the slice correlation data structure being stored in the queuing memory space.

The present invention may also be embodied in one or more methods. In a multi-slice network processor system comprising a plurality of processing slice modules, each module processing and storing a slice of packet data, an embodiment of a method for processing a packet in packet slices for transfer over a network interface comprises prepending a system header to the packet, the system header providing information for use by the multi-slice system, assigning a packet identifier to the packet, and segmenting data of the packet into cells, the data including both header and body data for the packet. For each cell, cell descriptive information is generated. Some examples of cell descriptive information that may be included are the packet identifier, a packet position indicator indicating an order position of data of the cell with respect to the packet, and a slice position indicator indicating an order position of the data of the cell with respect to a slice of data of the packet. In one embodiment of the present invention, the method further comprises delivering one or more cells of the packet to one or more processing slice modules based upon load balancing criteria. In another aspect of the present invention, the headers cells of the packet are delivered to one or more processing slices after the body cells of the packet.

In one embodiment of the present invention, the packet identifier is a sequence number representing an order of the packet in a communications flow. The packet identifier and a communications flow indicator in the cell descriptive information of each cell of the packet may be used as the basis of reordering or resequencing packets in a flow upon enqueing, during retrieval and during aggregation of the cells of a common packet back into packet form.

BRIEF DESCRIPTION OF THE DRAWINGS

FIG. 9E illustrates an example of a configuration of a medium-speed to high-speed interface across a switch fabric between two multi-slice network processor systems in accordance with an embodiment of the present invention.

FIG. 9F illustrates an example of a configuration of a high-speed to medium-speed interface across a switch fabric between two multi-slice network processor systems in accordance with an embodiment of the present invention.

FIG. 9G illustrates another version of the high-speed to high-speed interface example of FIG. 9A in which a switch adaptation layer is present in accordance with another embodiment of the present invention.

FIG. 9H illustrates another version of the high-speed to medium-speed interface example of FIG. 9F in which a switch adaptation layer is present in accordance with another embodiment of the present invention.

DETAILED DESCRIPTION OF THE DRAWINGS

Figure 1:
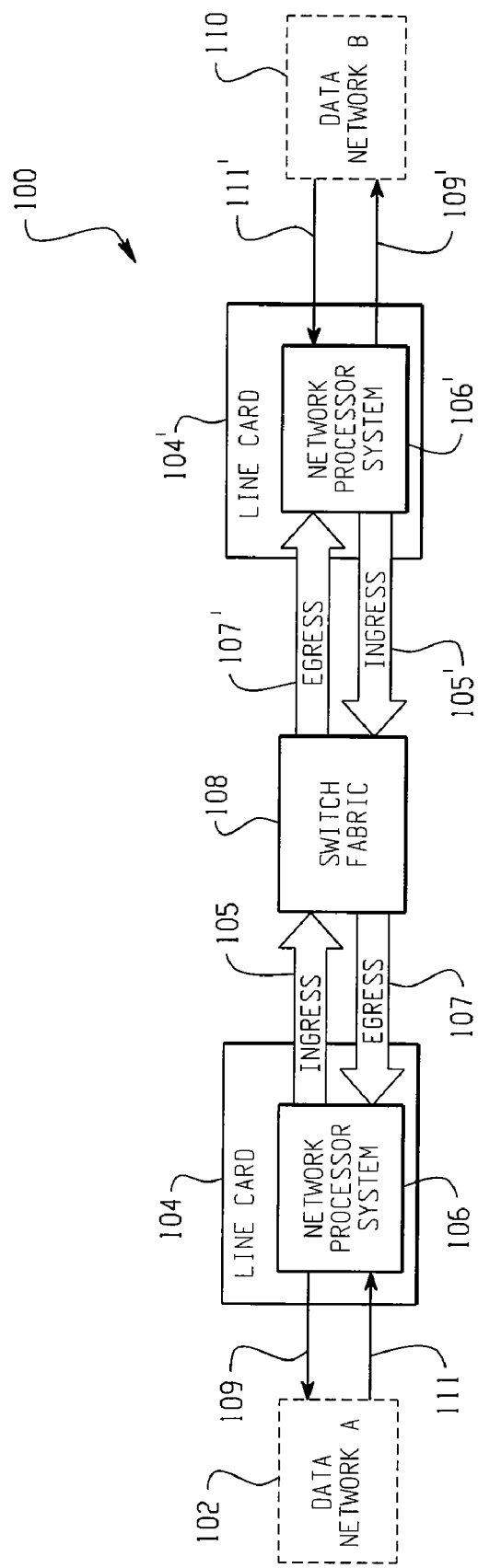
FIG. 1 illustrates a system in which one or more multi-slice network processor systems may operate in accordance with an embodiment of the present invention.

FIG. 1 illustrates a system 100 in which one or more multi-slice network processor systems may operate in accordance with an embodiment of the present invention. A network processor system 106, 106' may be embodied on a line card 104, 104' interfacing between a data network 102, 110 and a network interface, in this embodiment a switch fabric 108. Network processor system 106 receives packets via a communication interface 111 of the line card 104 from Data Network A 102. The network processor system 106 processes each packet received into one or more packet slices that are forwarded in parallel through an ingress communication interface 105 to the switch fabric 108. The use of the terms "ingress" and "egress" refer to the directional flow of data with respect to the switch fabric 108. For example, the communication interface 105 is referred to as an ingress communication interface 105 because it sends data into the switch fabric 108. Data from the switch fabric is received by another network processor system 106' via egress communication interface 107'. The network processor system 106' formats the slices of packet data back into a packet for delivery 109' to Data Network B 110. In the reverse direction, the network processor system 106' receives via communication interface 111' a packet from Data Network B 110 and slices the packet up into slices of data for transfer to the switch fabric 108 via ingress communication interface 105'. The network processor system 106 receives one or more slices of the packet from across the switch fabric 108 via egress interface 107 for formatting back into a packet which it transfers via communication interface 109 to Data Network A 102.

Figure 2:
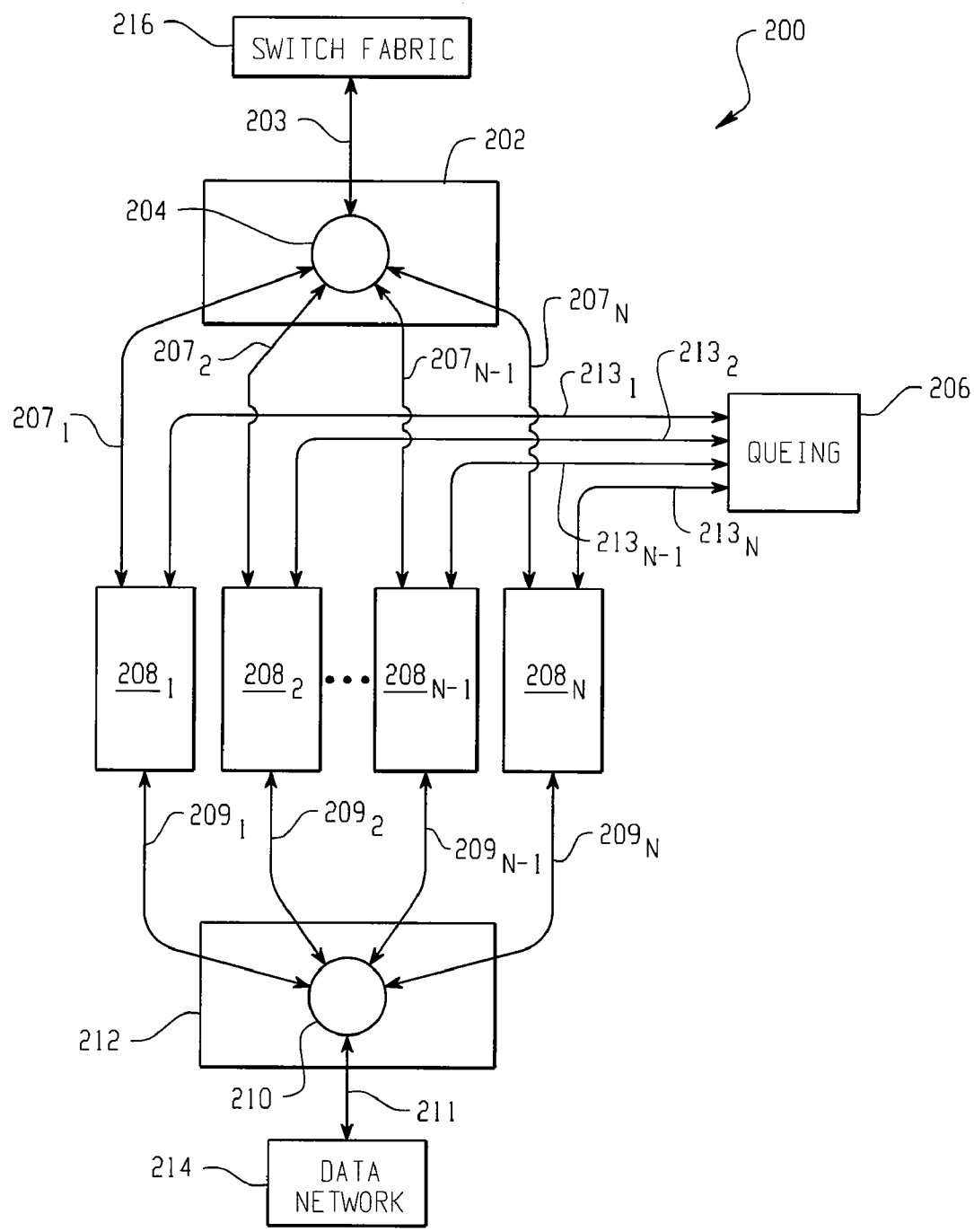
FIG. 2 illustrates a multi-slice network processor system for processing packets across a network interface in accordance with an embodiment of the present invention.

FIG. 2 illustrates a multi-slice network processor system 200 for processing packets across a network interface in accordance with an embodiment of the present invention. Each of the modules comprises logic which may be stored in one or more computer usable mediums and executed in a variety of device types, including combinations thereof, some examples of which are an integrated circuit, a programmable logic device (PLD) or a central processing unit (CPU). Furthermore, each of the memories discussed may be implemented in a variety of types of memories, one example of which is first in first out (FIFO) memories. The system 200 comprises a first data distribution and aggregation module 202, hereafter referred to as the switch data distribution and aggregation module 202 as it interfaces with a network interface illustrated as a switch fabric 216, packet slice processing and storage modules $208_1$ to $208_N$, a queuing module 206, and a network data distribution and aggregation module 212 hereafter referred to as the network data distribution and aggregation module 212 as it interfaces with a data network 214.

As is readily apparent to those of skill in the art, the network processor system may interface with a variety of network interfaces, examples of which are switches, routers, and switch fabrics as well as single port network interfaces. Similarly, the network processor system 200 may interface with a channelized network in which logical data channels flow on the same physical channel. For example, a number of logical channels of data traverse the same switch fabric port.

The network data distribution and aggregation module 212 receives a packet from a data network 214 via communication interface 211. The network data module 212 may also add a system header for use by the multi-slice network processor system. In one example, the system header is prepended to the original header of the packet as received from the network. The network data module 212 communicates information useful for lookup processing and queuing functions through indicators such as fields in the system header. Examples of information indicated that may be included are the byte count for the packet, the cell count, a validity check result (e.g. checksum), or a source identifier indicating the source of the traffic. An example of a source identifier is an indicator of the input port over which the packet was received. The other modules, for example, such as a processing slice module $208_N$, may either add fields to the header or fill in fields, as the system header progresses through the system and across the switch fabric 216.

The network module 212 segments the received packet into smaller data blocks hereafter referred to as cells. The network module 212 divides the packet into sequences of bytes whose length matches that of a target cell size. Any remainder bytes are allocated to the packet's last cell. A fractional last cell may either be shorter than the other cells of the sequence or padded with dummy bytes to match the target cell size. A fractional cell's descriptive information includes an indicator of the number of valid bytes it contains. In one example, the cells may be uniformly sized. In another example, the cells may vary in size.

Each cell has descriptive information communicated along with the cell itself. This descriptive information may include the number of valid bytes in the cell, the identify of packet to which the cell belongs and the relative or absolute position of the cell within the parent packet. For example, a cell header may be attached to each of the cells, the header including a packet identifier. Additionally, the cell header may include a packet position indicator identifying its position in the packet. A packet position indicator may be implemented as an end of packet indicator, a start of packet indicator, and a combination of both. For example, a cell having both its end of packet indicator and its start of packet indicator both set indicates the cell contains the entire packet. The cell header may also include a slice position indicator identifying the cell's position in a packet slice of data. Though described here as a header, these values may form a trailer for the cell, may be embedded within the cell at some point or be communicated by some "out of band" data path. An example of an "out of band" path would be a separated control information path.

In one example, network data module 212 assigns the packet identifier for each cell header as a sequence number indicating the order of the packet received from an attached network (e.g. 214) over a port (e.g. 211). The sequence numbers may be monotonically increasing as the packets are received. Sequence numbers address the misordering of packets as may arise in a load balancing scheme.

The network data distribution and aggregation module 212 comprises a data, switch 210 for selecting one of the packet slice processing and storage modules $208_1$ to $208_N$, hereafter also referred to as processing slices $208_1$ to $208_N$ from which to either receive or send a buffer of data via a communication interface $209_N$. An example of a buffer of data is a group of cells. As a packet may actually fit into one cell, a group of cells or a buffer may have only one cell as a member. In one example, the selection of slices to process and store the slices of the packet is performed in a round robin fashion. A target size for a buffer of cells is established, and a buffer is assigned to each slice. The round robin counting begins with the index of the processing slice, e.g. $208_2$, storing the buffer including the start of the packet. In this example, the packet requires four buffers. The next buffer of the same packet is assigned to the next processing slice in sequence $208_3$, the next buffer in $208_4$, and the index into the slices wraps around to $208_1$ for the last buffer of the packet.

In an example wherein the network module 212 performs load balancing, the network module distributes the packets across the slices, for example using an efficient bin packing algorithm, in order to have an approximately equal balance for header processing among the slices. Additionally, the network module 212 distributes the packets to achieve an approximately equal balance for bandwidth in terms of the number of body cells processed across the slices. The network module 212 may consider various factors in making a load balancing decision. Example of some of these factors are: 1) numbers and lengths of previously scheduled packets; 2) current congestion levels of the slices; and 3) numbers and lengths of packets awaiting slice assignment. The module 212 may choose the optimal slice for each packet in accordance with a load balancing algorithm without being sensitive to the order in which slices are chosen for packet assignment.

Each of the processing slices $208_1$ and $208_N$ performs lookup functions with respect to the packet slice received from the network module 212. One example of a lookup function is determining the network destination of the slice's associated packet. The system software (not shown) establishes and maintains a variety of lookup tables. Using one or more fields in a packet's header data, the processing slices $208_1$ and $208_N$ search these tables in order to make network destination determinations. For example, by examining layer 2, layer 3 and other packet header information, the processing slice $208_N$ determines to which line card, network interface and VLAN/channel the packet is to be forwarded. The processing slice $208_N$ determines to which communications flow the packet belongs. A communication flow exists when certain path-identifying parameters are shared by a sequence of packets. These parameters include but are not limited to: source port, destination port, virtual LAN, priority and protocol type. It is desirable that within a flow, the order of packet transmission from a switching/routing system matches that of packet reception. If channelized operation is in use, the communications flow may be part of a logical channel traversing the same physical channel as other logical channels. The cell descriptive data may include a communication flow identifiers. The communication flow identifier may include a channel number indicator. In one example, the channel number indicator may include a source identifier, for example the source port through which the packet was received as well as a destination identifier such as a destination index for an egress port of the switch fabric. The processing slice $208_N$ determines, based on the network destination for the packet, the destination identifier for the packet. In another example, a processing slice also determines a queue number for the packet which is included in a system header for the queuing module 206 to read. Some other examples of functions that may be performed include packet editing, communication of packet length change, access control, priority assignment/confirmation, and other such features. Each processing slice $208_1$ and $208_N$ also has access to a storage sub-system including memory for storing one or more buffers for each processing slice $208_1$ and $208_N$ and buffer manager. The buffer manager maintains a buffer correlation data structure for correlating one or more buffers of the same packet slice. An example of a buffer correlation data structure is a linked list.

In this embodiment, each of the processing slices $208_1$ to $208_N$ is identical with respect to the functions performed, speed of processing and amount of memory for buffering. In an alternative embodiment, one or more of the slices may differ in speed or memory size aspects or functions performed or a combination of the three. Such differences in the slices may accommodate, for example, data of different priority levels.

The queuing module 206 controls the enqueuing and dequeuing of the packet slices stored by the processing slices $208_i$ to $208_N$. The processing slices $208_1$ to $208_N$ communicate enqueuing related messages via communication interface $213_1$ to $213_N$ to the queuing module 206 for each of the slices of a common packet. Based on information in the enqueuing related messages, the queuing module 206 maintains a packet slice correlation data structure for correlating one or more slices of the same packet so that they may be grouped together as a single queue entry. An example of information in the enqueuing messages used for correlation are indicators identifying the one or more memory buffers holding the first cell of each slice of the packet. A packet reference for identifying the packet may be embodied as an indicator identifying the buffer including the cell including the start of the packet. Other information that may be included in the enqueuing related messages includes the packet identifier and the communications flow identifier or channel number. The queuing module 206 uses the packet identifier to correlate several pending enqueue messages from different slices in order to generate a slice correlation data structure correlating all the slices. The packet identifier may also be used to maintain packet sequence. Other examples of information that may be included are a slice identifier, a queue number, packet length, cell count and indicators of size adjustment to packet length or cell count, a priority indicator, a discard indicator, a multicast index, and a validity indicator for queue numbers. There may also be primary and secondary designations with respect to queue numbers and the fields related to them. Additionally, a preceding end of packet indicator may be included to indicate the "end of packet" status for the preceding word or words for example not an end of packet, a normal end of packet, or an end of packet with abnormal termination.

In an example in which sequence numbers have been assigned to packets, the queuing module re-sequences the packets as necessary to ensure that the packets from each flow are queued in the order in which they were originally received. The queuing module 206 has access to memory buffering space for packets or references to packets for the purpose of re-sequencing. The sequence numbers that accompany each packet are used as indexes into this buffering space. The sequence numbers conveyed by each packet need not have sufficient bit width to cover the addressing range of the entire packet re-sequencing buffer space within the queuing module. The upper bits of the sequence number may be inferred by the queuing module. For example, the field width of the sequence number conveyed by each packet need only be great enough to accommodate a number which is greater than the maximum number of packets which will not be directed to a particular slice. In other words, if it is guaranteed that a particular slice will not be passed over for allocation of a packet by more than, say, 100 packets, then a sequence field width of 7 bits is sufficient ($2^7=128$).

Continuing with the above example, if the maximum slice skew is 2,000 packets, then a re-sequencing space of at least 2,000 packets is required. An 11-bit address value is necessary to access 2,048 storage locations. The lower seven bits of the sequence value are provided by the packets themselves. The upper four bits are inferred by the queuing function.

The queuing module 206 assumes that the initial sequence number is zero for each slice. Whenever the queuing function observes a slice delivering a sequence number that is smaller in value that the immediately preceding sequence value for the same slice, then the queuing function increments its locally maintained upper four bits of the sequence number. The locally maintained upper four bits are concatenated with the lower seven bits to form an index into the re-sequencing storage space. Independent sets of upper bits are maintained in this manner for each channel.

When a packet's reference reaches the head of a queue, the queuing module 206 selects that queue for service, and dequeuing of the slices of a common packet is initiated by sending a dequeuing message to each slice 208N over a respective communication interface 213N. The order in which a multitude of queues are serviced is dependent upon a number of factors including the absolute priority of each queue and its relative weighting within a priority level. In an example where the packet identifiers are sequence numbers, during dequeuing and retrieval, the queuing module 206 assigns new sequence numbers which either the switch module 202 or network module 212 may use in correlating the cells of a packet and ordering the packet in its right order for transmission over its respective network interface.

For each packet slice, the queuing module 206 send in the dequeuing message a channel number identifying the corresponding destination processing slice (e.g. $208'_N$) of another network processor system (See e.g. 106' in FIG. 1') across the switch fabric 216. Furthermore, the queuing module 206 may load balance the processing of the packet slices across the switch fabric 216. Load balancing in this example is based upon utilizing the crossbar capabilities of the attached switch fabric. For example, in the context of FIG. 1 in which the network processor systems 106 and 106' are embodied as the multi-slice network processor system 200, the queuing manager 206 of system 106 provides channel numbers that point to destination processing slices (e.g. $208'_1$ to $208'_N$) of system 106' across the switch fabric to processing slices $208_1$ to $208_N$ of system 206 for the processing of packet slices. Therefore, each of the slices can be transferred across the switch fabric independently of the other slices.

The switch data distribution and aggregation module 202 receives via communication interfaces $207_1$ to $207_N$ dequeued packet slices destined for the switch fabric 216 from each of the processing slices $208_1$ to $208_N$ and aggregates them. Data switch 204 selects data from each slice for aggregation. Although the switch module 202 aggregates the slices of a packet back into the packet in one data flow to the switch fabric 216, the aggregation does not effect the assignment of destination processing slices across the switch fabric as the channel number is included in each cell header. In this embodiment, the cell headers and system headers added and modified by the network process system 200 are maintained across the switch fabric for use by an analogous system (e.g. 106') on the other side.

The switch data distribution module 202 also receives packet slices across the switch fabric 216 from an analogous system 200'. In this example, the switch data distribution module 202 receives the packet slices for a particular packet aggregated together. The switch module 202 distributes the packet slices to each of the processing slices $208_1$ to $208_N$ for storage. In this embodiment, the system header for the packet and the cell headers are those that were added by a corresponding network data module (e.g. 212') and modified by the processing slices and queue manager 206' in the analogous system 200' across the switch fabric 216. The switch module 202 may reassign sequence numbers to the cells or the sequence numbers assigned by the queue manager 206' for dequeuing may be kept in place for use.

For the egress data received from the switch module 202, the processing slices $208_1$ to $208_N$ communicate enqueuing related messages to the queuing module 206 for each of the slices of a packet. When a packet's reference reaches the head of a queue, the queuing module 206 selects that queue for service, and dequeuing is initiated in a similar manner as discussed above.

Upon dequeuing, the processing slices $208_1$ to $208_N$ may optionally perform lookup functions. Other functions may also be performed such as packet editing, priority control, access control, and compensating for packet size adjustment. The processing slices $208_1$ to $208_N$ forward the packet slices to the network data distribution and aggregation module 212 which uses the information such as the packet identifier, channel number, packet length, and cell count in the system and cell headers to aggregate the slices into packet format. The module 212 sends the packet to the data network 214 via communication interface 211.

Figure 3:
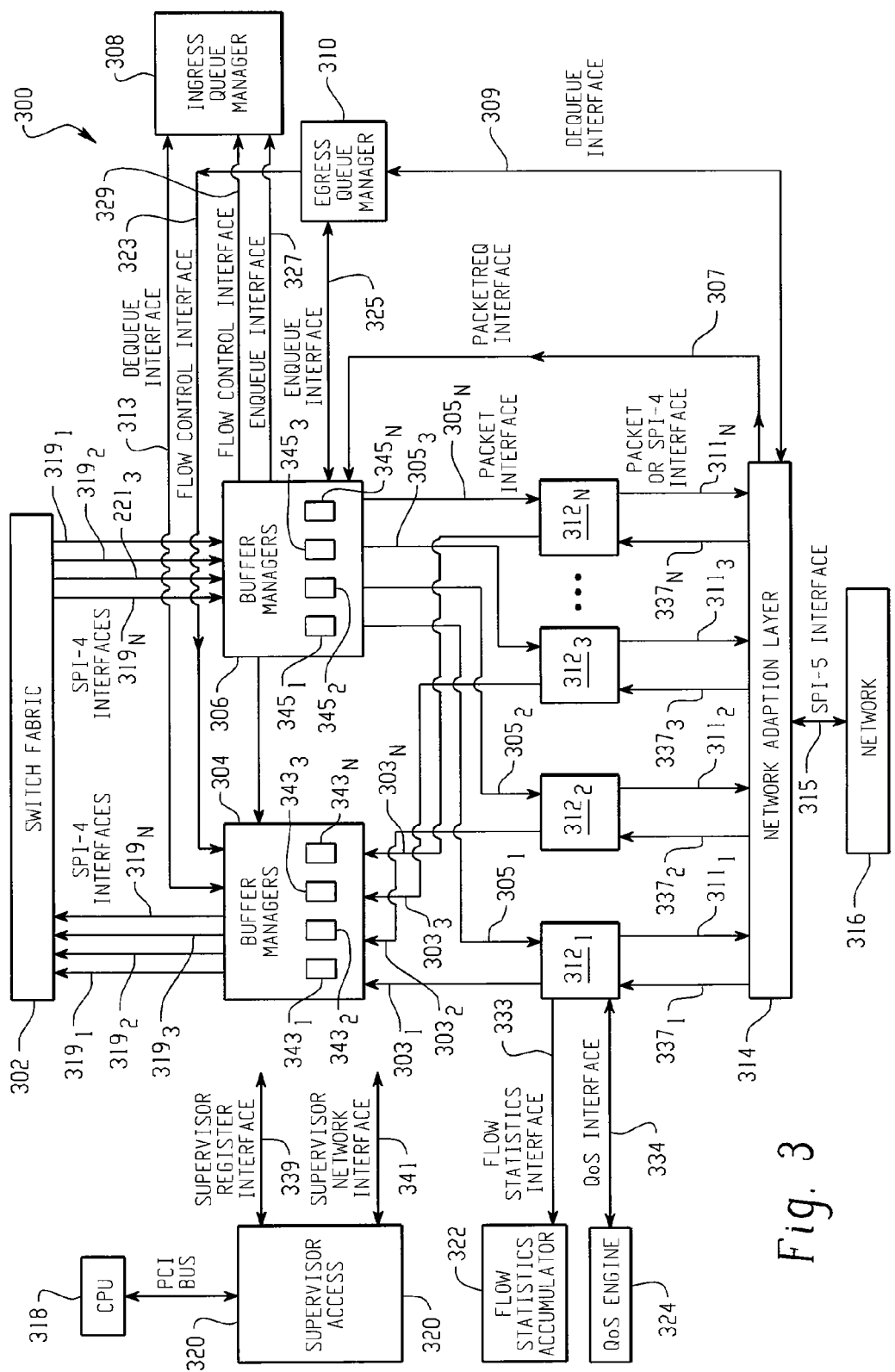
FIG. 3 illustrates a multi-slice network processor system for processing packets across a switch fabric in accordance with another embodiment of the present invention.

FIG. 3 illustrates a multi-slice network processor system 300 for processing packets between network interfaces in accordance with another embodiment of the present invention. The example network interfaces are again a switch fabric 302 and System Packet Interface (SPI)-5 Interface for a data network 316. The system 300 comprises a number of modules including a network adaptation layer 314, forwarding engines $312_1$, $312_2$, $312_3$, $312_N$, an ingress buffer manager 304, an egress buffer manager 306, ingress queue manger 308, egress queue manager 310, a supervisor module 318, a supervisor access interface 320, a flow statistics accumulator 322, and a quality of service engine 324.

The modules communicate through various communication interfaces. An example of a communication interface is a port connection. Another example of communication interface is a System Packet Interface (SPI). Another example of a communication interface is a connection between a processor executing one or more of the modules and a memory controller responsible for memory reads/writes. Another example is one module reading a parameter (e.g. a header field) stored in a memory location by another module. Another example of a communication interface is a message. Of course, other communication interfaces known to those of ordinary skill in the art may also be used.

In this more detailed example, a processing slice analogous to one of the processing slices $208_1$ to $208_N$ of FIG. 2 comprises a forwarding engine $312_N$, memory $343_N$ for storing one or more buffers of data processed by the forwarding engine in the ingress direction, an ingress buffer manager 304 for managing these buffers $343_N$, memory $345_N$ for storing one or more buffers of data for processing by the forwarding engine $312_N$ in the egress direction, and an egress buffer manager 306 for managing these buffers $345_N$. The buffers $343_N$ and $345_N$ provide deep, short-term storage resources for slices of packets traversing the system. In this system embodiment, the network adaptation layer module 314 is an example of a network data distribution and aggregation module 212 and performs analogous functions. Examples of such functions are prepending a system header to the packet. Other examples include the distribution of a packet into cells and the reordering of cells into a packet. The network adaptation module 314 receives and sends packets from and to the network 316 through a communication interface 315 which in this example is a System Packet Interface Level 5 (SPI-5) interface. The network adaptation layer module 314 sends cells of packet data over communication interfaces $311_1$ to $311_N$ to the forwarding engines $312_1$ to $312_N$. An example of an implementation for these interfaces are System Packet Interface Level-4 (SPI-4) interfaces. The network adaptation layer module 314 is also communicatively coupled via dequeue interface 309 with the egress queue manager 310. The network layer module 314 is also communicatively coupled to the egress buffer manager 306 via a packet request interface 307. This embodiment illustrates a "pull model" of packet retrieval for packet slices that have egressed from the switch fabric 302. In the pull model, the egress queue manager sends a dequeue message to the network module 314 responsive to which the network module 314 may send an acknowledgement to the queue manager 310. Responsive to the dequeue message, the network module 314 sends a packet request including the packet reference (buffer number including first cell of the packet) and a cell request message for each cell to the egress buffer manager 306. In the pull model, a packet interface may comprise a request transfer path for transferring request or control messages such as a packet request and cell request messages and a cell transfer path for transferring the cells themselves from memory under the control of the egress buffer manager 306. If a push model of retrieval were used, the egress queue manager 310 would send the dequeue message over a dequeue interface (not shown but one similar to 313 may be used) to the buffer manager 306 which then "pushes" the cells of the desired packet through the forwarding engines $312_1$ to $312_N$ to the network module 314.

In this system embodiment, the forwarding engines $312_1$ to $312_N$ are utilized in parallel to achieve a higher system performance. The forwarding engine $312_N$ performs lookup functions with respect to the packet slice received analogous to those discussed above with respect to the processing slices $208_1$ to $208_N$. In one example, each forwarding engine $312_N$ utilizes ternary content-addressable memories (TCAMs) and an assortment of conventional memories to attempt to find matches in the lookup tables maintained by the system software which will yield the destination parameters.

One set of parameters retrieved during the lookup process may comprises pointers into data bases that contain replacement data structures for the subject packet's header or instructions on how to modify the existing header. As part of the packet editing function, superfluous information is removed from the packet's header (such as layer 2 addressing information if the packet is to be forwarded based on layer 3 information, or tunneling encapsulation information when the current system acts as a tunnel end point). Certain values may be modified (such as the packet's priority level). New fields may also be added.

As part of its lookup process, a forwarding engine $312_N$ may send the communications flow identifier for a packet, its sequence number along with the length of the packet to a Flow Statistics Accumulator (FSA) module 322 through a communication interface referred to in this example as a flow statistics interface 333. This FSA module 322 may be either integrated with the Forwarding Engine or implemented separately. The Flow Statistics Accumulator module 322 gathers these statistics on a per-connection basis and enables traffic analysis and detailed billing capabilities. Similarly, each forwarding engine $312_N$ communicates information such as byte count length to the Quality of Service (QoS) engine 324 over communication QoS interface 334 as input for QoS algorithms.

One or more cells of a packet are forwarded via communication packet interface $303_1$ to $303_N$ to the ingress buffer manager 304 for storage. As there may be a target size for a cell, there may also be a target size for a buffer such as a certain number of cells or bytes so that the throughput from each of the slices is approximately the same. As the one or more packet cells are stored in buffers, the ingress buffer manager 304 maintains a buffer correlation data structure linking the buffers of a slice of data associated with the same packet. If a single slice of data includes the entire packet, the data structure is for the entire packet. In an alternate embodiment, either buffer manager 304, 306 may link the buffers of a packet across the slices in the data structure. In one example, the buffer correlation data structure is a linked list of buffer identifiers, for example numbers representing indices, that, when complete, identify the buffers that make up the slice.

In this example, each packet slice is stored independently by the ingress buffer manager 304. Upon completion of the storage of a packet or packet slice, the ingress buffer manager 304 issues an enqueue message to the ingress queue manager 308 over the Enqueue Communication Interface 327. The ingress buffer manager 304 sends an enqueue message to the ingress queue manager 308 for each slice of a common packet via the enqueue communication interface 327. One of the enqueue messages includes the packet reference. One example of such an enqueue message is referred to as an EnqueueMasterSlice message. The "master" designation indicates that this processing slice includes the packet slice including the start of the packet. This example comprises the following information: a preceding end of packet indicator is included for indicating the "end of packet" status for the preceding word or words, the indicator may indicate that the preceding word(s) was not an end of packet, was a normal end of packet, or was an end of packet with abnormal termination; a packet reference identifying the buffer including the cell including the start of the packet; a channel number which indicates the destination port for the slice, for example a port of a destination line card across the switch fabric, and which may also indicate the source of the packet, e.g. the packet's receive port; the packet identifier; a slice identifier (e.g. slice number or index) of the slice sending the message which is the master slice; a queue number of the queue to which the packet is assigned; a cell count indicator indicating the number of cells used to store the associated packet; a cell count delta indicator identifying the number of cells added to or deleted from the packet by a forwarding engine $312_N$ during ingress storage; a packet length adjustment indicator identifying the byte-length adjustment for the packet; a priority indicator indicating the packet's priority level; a length delta indicator, which has been generated by a forwarding engine (e.g. $312_N'$) during ingress storage in a corresponding system across switch fabric 302, which is an index into a table that indicates the approximate number of bytes that will be added to or deleted from the packet by a forwarding engine $312_N$ during egress retrieval; a discard indicator indicating whether an error has occurred with the reception or storage of the packet and the packet should be discarded; a multicast bit indicating that the queue number should be interpreted as a multicast index; and a validity indicator for the queue number. There may also be primary and secondary designations provided with respect to queue numbers and the fields related to them as well.

If the packet is stored in more than one processing slice, an additional enqueuing message is used to point to the first cell of the start of each packet slice in the respective processing slice. An example of such a message is referred to as an EnqueueSlaveSlice message. This example comprises the following information: a preceding end of packet indicator is included for indicating the "end of packet" status for the preceding word or words, the indicator may indicate that the preceding word(s) was not an end of packet, was a normal end of packet, or was an end of packet with abnormal termination; a slice reference identifying the buffer including the cell including the start of the packet slice; a channel number which indicates the destination port for the slice, for example a port of a destination line card across the switch fabric, and which may also indicate the source of the packet, e.g. the packet's receive port; the packet identifier; a slice identifier (e.g. slice number or index) of the slice sending the message; and a discard indicator indicating whether an error has occurred with the reception or storage of the packet and the packet should be discarded. When there are multiple enqueue messages, the ingress queue manager 308 correlates the master and slave messages based upon the packet identifier and channel number indicator received in each message.

The ingress buffer manager 304 further comprises a dequeue interface 313 with the ingress queue manager 308 and a flow control interface 323 with the egress queue manager 310. When a packet reference is popped from the head of a queue for ingress retrieval, the ingress queue manager 308 sends a message on the communication dequeue interface 313 to the ingress buffer manager 304 in order to initiate the retrieval and delivery of the desired packet. In one example, one such dequeue message is sent for each buffer manager that stores a slice of the packet. Within each dequeue message, one buffer number is included for each slice of the packet within the buffer manager that is the destination for the message. One example of a dequeue message that may be sent for either ingress or egress retrieval comprises one or more indicators as follows for providing the information the buffer manager needs in order to retrieve the data of the associated packet: a preceding end of packet indicator is included for indicating the "end of packet" status for the preceding word or words, the indicator may indicate that the preceding word(s) was not an end of packet, was a normal end of packet, or was an end of packet with abnormal termination; a channel number which indicates the destination port for the slice, for example a port of a destination line card across the switch fabric, and which may also indicate the source of the packet, e.g. the packet's receive port; a packet identifier assigned by the corresponding queue manager 308, 310 for correlation and sequencing purposes; at least a master buffer number identifying the buffer including the cell including the start of the packet, and if there are slave slices for the packet, an additional slave buffer number identifying the buffer including the cell including the start of the packet slice for each respective slave slice; a master only indicator which is asserted to indicate that the packet being dequeued exists only as a master slice even though its length would ordinarily be load balanced across multiple slices; a cell count indicator indicating the number of cells used to store the associated packet; a cell count delta indicator identifying the number of cells added to or deleted from the packet by a forwarding engine $312_N$ during ingress storage (note this field need not be present during egress operations); a master slice indicator may be part of the message when the dequeue message is sent to the network module 314 as part of a pull model; a retrieval count delta indicator which, upon completion of the retrieval of a packet slice, is subtracted from a packet's retrieval count value within a slice's buffer table stored by each buffer manager 304, 306; a discard indicator indicating whether an error has occurred with the reception or storage of the packet and the packet should be discarded; a multicast indicator and a multicast offset indicator, wherein when multicast is asserted, the multicast offset indicator provides an offset into a multicast expansion table which is administered by a forwarding engine $312_N$ from which replacement headers are drawn during multicast replication. Multicast offset is copied by the buffer manager into multicast offset in the egress retrieval packet header.

A dequeue packet acknowledge message provides channelized flow control for the dequeue packet messages. In one example, the acknowledgement message includes a a preceding end of packet indicator, a channel number representing the channel number that is acknowledging a dequeue packet message, and a sequence field that is incremented for every dequeue packet acknowledgement message for a particular channel. Independent count sequences are maintained for each channel on each interface.

In this embodiment, each buffer manager 304, 306 has a communication interface for each forwarding engine $312_N$ whose memory $343_N$ it manages with a port of the multi-port switch fabric 302 that transfers the slice in a channel through the switch fabric 302 to an egress port from which a destination processing slice of memory $345_N'$ and a forwarding engine $312_N'$ receives the data on the other side of the switch fabric 302. Because a single buffer manager is used to handle all of the ingress switch fabric bandwidth and another buffer manager is used to handle all of the egress switch fabric bandwidth, load balancing between the buffer managers and the switch fabric is not necessary. Without another adaptation layer with the switch fabric 302 a benefit such as increased transmission speed is provided as the aggregation and distribution functions need not be performed.

The egress buffer manager 306 has communication interfaces $321_1$ to $321_N$ illustrated in this example as SPI-4 Interfaces, with the switch fabric 302 through which it receives each of the egress slices of packet data from the switch fabric 302. The manager 306 stores each of the egress slices and sends enqueue messages. The same enqueue message examples as discussed above may be sent to the egress queue manager 310 via enqueue communication interface 325. As the slices are transferred across the switch fabric, the cell headers are maintained. From the packet identifier and a slice position indicator in the cell header, the buffer manager 306 identifies the master slice of an egress packet and any additional slices of the packet that may have been transferred as well. The egress buffer manager 306 sends the Enqueue Master Slice and Enqueue Slave Slice messages to the egress queue manager 310.

When the queue entry for this packet is selected for service, egress queue manager 310 sends a dequeue message via interface 309 for the packet to the network adaptation layer module 314. The network adaptation layer 314 formulates a packet request message based on the information in the dequeue message which it sends over the packet request communication interface 307. The packet request message initiates the retrieval of a packet from the egress buffer manager 306. The packet request message "opens" a packet and delivers its first cell. All subsequent cells are delivered in response to cell request messages. In this example, the cell request message is only sent subsequent to a preceding packet request message. Every cell of a packet other than the first cell is delivered in response to a cell request message. In an example in which the cell request message does not specify a buffer number, it is implied that the cell request is for the next cell of the current packet within the same channel. In one example, a packet request message is formulated from the dequeue packet message example discussed above and comprises the following information: a preceding end of packet status indicator; a channel number for the packet; a master only indicator indicating the packet is all within the master slice; a buffer number indicating the storage location of the master or slice start cell of the packet; a master field which is asserted to indicate that the slice being requested is the packet's master slice; a master end field indicating the cell being requested is a master end cell meaning it marks the end of a master slice's header; a slice end field which is asserted when the packet request message is requesting the one and only cell of the packet's slice; a last cell indicator which is asserted to indicate the cell being requested is the very last cell of a packet, a slice number indicating a slice through which the requested cell should be delivered, a retrieval count delta field indicating the delta to be subtracted from the packet's retrieval count value upon completion of the retrieval of the slice end cell, a discard field which is asserted to indicate that the specified packet should be retrieved but not actually delivered across the packet interface $305_N$, a multicast indicator which is asserted to indicate that a multicast offset is valid; and a multicast offset that provides an offset into a multicast expansion table from which alternative packet headers are drawn for multicast packet replication.

An example of a cell request message comprises the following information: a preceding end of packet status indicator; a channel number for the packet; a master end field indicating the cell being requested is a master end cell meaning it marks the end of a master slice's header; a slice end field which is asserted when the packet request message is requesting the one and only cell of the packet's slice; a last cell indicator which is asserted to indicate the cell being requested is the very last cell of a packet; and a slice number indicating the slice through which the requested cell should be delivered. In this example, no buffer numbers or other explicit pointers to packet data are included in the cell request message. The buffer correlation data structure maintained by the egress buffer manager 306 is used to locate the packet's cells within a slice. For example, if a linked list is the type of buffer correlation data structure, pointers are traversed which link one cell to the next. The egress buffer manager 306 has a packet interface communication interface $305_N$ with each of the forwarding engines $312_N$ through which it forwards cells of a packet. Each of the forwarding engines $312_1$ to $312_N$ may add or delete a number of bytes from the packet and then forward the cells of the slice it processed via packet interface $311_N$. It further comprises a flow control interface 329 with the ingress queue manager 308.

Each of the queue managers 304, 306 receives enqueuing related messages and generates dequeuing related messages as discussed above. In between these two activities, a queue manager 308, 310 performs a variety of processes. Some examples of these processes include maintaining a large number of queues, managing resources, managing flow control, and managing load balancing.

A bit in the packet's header data may indicate that the packet is to be multicast. Multiple queues receive entries for a single packet if the packet is to be multicast to multiple destinations.

The system 300 allows for the multicasting of packets through the use of multiple retrievals of a single copy of a packet. Each packet stored has an entry in a corresponding data base that indicates the number of expected retrievals. As each retrieval of a packet is performed, a retrieval count delta value supplied with the dequeue message is applied to the packet's retrieval count. When the retrieval count reaches zero, the packet's storage resources are returned to the free list and made available for the storage of future packets. The retrieval count delta value supplied by the dequeue packet messages may be of any value so long as the total of all the deltas for a particular packet equals the initial retrieval count value established upon storage of the packet.

It is possible that the enqueuing operations may fall temporarily behind the reception, packet processing and storage operations. For example, one of the queue managers 308, 310 can initiate retrievals faster than the attached switch fabric or network interface can accept them. This is especially so for longer packets as each packet infers a greater number of bits to transport.

Flow control prevents accidental loss of packet enqueue messages. Examples of three different flow control scopes are: global, slice and channel. Global flow control would halt or slow the flow of all channels and slice whenever engaged. Slice-oriented flow control modulates the arrival rate of enqueue messages from a particular slice while not affecting the remaining slices. This form of flow control is well suited for limiting slice skew and, hence, the temporary table storage requirements for packet reordering and slice correlation. Finally, channel-based flow control offers the greatest flexibility in managing the rate of enqueue messages. The system 300 embodies the use of slice-oriented flow control.

Since forwarding and buffering functions are performed in parallel, it is beneficial that the enforcement of flow-based bandwidth restrictions be performed in a central location in the system through which all traffic or at least the relevant information from all traffic flows. A queue manager 308, 310 is an example of such a central location. The queue manager 308, 310 submits the lengths of the packets being queued to policers which apply to the associated flow. For example, if the additional bandwidth represented by a packet being queued exceeds a predetermined limit, the packet is either dropped outright or merely has its priority level lowered. At a new, lower priority level, the packet may indeed be dropped. The ingress buffer manager 304 has a flow control communication interface 323 from the egress queue manager 310. The egress buffer manager 306 has a flow control communication interface 329 with ingress queue manager 308.

The supervisor module 318 performs one or more supervisory functions for the other modules in the system examples of which include initializing, monitoring or updating the various modules in the system. In the illustrated embodiment, each of the modules communicates with the supervisor module 318 through the supervisor access interface 320. The supervisor access interface 320 provides the supervisor module 318 with access to configuration and status registers as well as various internal and external memories for each module (e.g. 308, 310, 304, 306, $312_N$, etc.) in the system for configuration and testing purposes. Two examples of types of accesses supported are registers accesses (which includes memories and data structures) and network accesses. The illustrated supervisor register interface 319 may be implemented in one example through a series of simple messages which allow for reads and writes of blocks of data. Each message has a destination address for a specific module. The modules participate in a communication path such as loop in which a message received by but not destined for a specific module is forwarded to the next module without modifying or interpreting the message.

The supervisor network interface 231 in this embodiment provides access for the supervisor module to the attached networks. In one example of an implementation of the supervisor network interface 341, dedicated channels and queues are used. For example, when a forwarding engine 312N determines that a received packet should be directed to the supervisor module 318, it is directed to one of perhaps several queues dedicated to the supervisor module 318 for the reception of network traffic. Upon dequeue, the packet is assigned to one of several channels dedicated to the supervisor module 318. One of the buffer managers (304, 306) recognizes this channel number and directs the packet to the supervisor network interface 341 (or supervisor access interface 320 which provides the supervisor module 318 with the packet via register reads. Packets transmitted by the supervisor module 318 are delivered to the buffer managers (304, 306) with a packet header already in place as if the packet had just emerged from a forwarding engine 312N. The header has the information for addressing the packet to the appropriate queues within the Queue Manager so that the packet is eventually forwarded to the appropriate local network port or remote network port across the attached switch fabric.

Figure 4A:
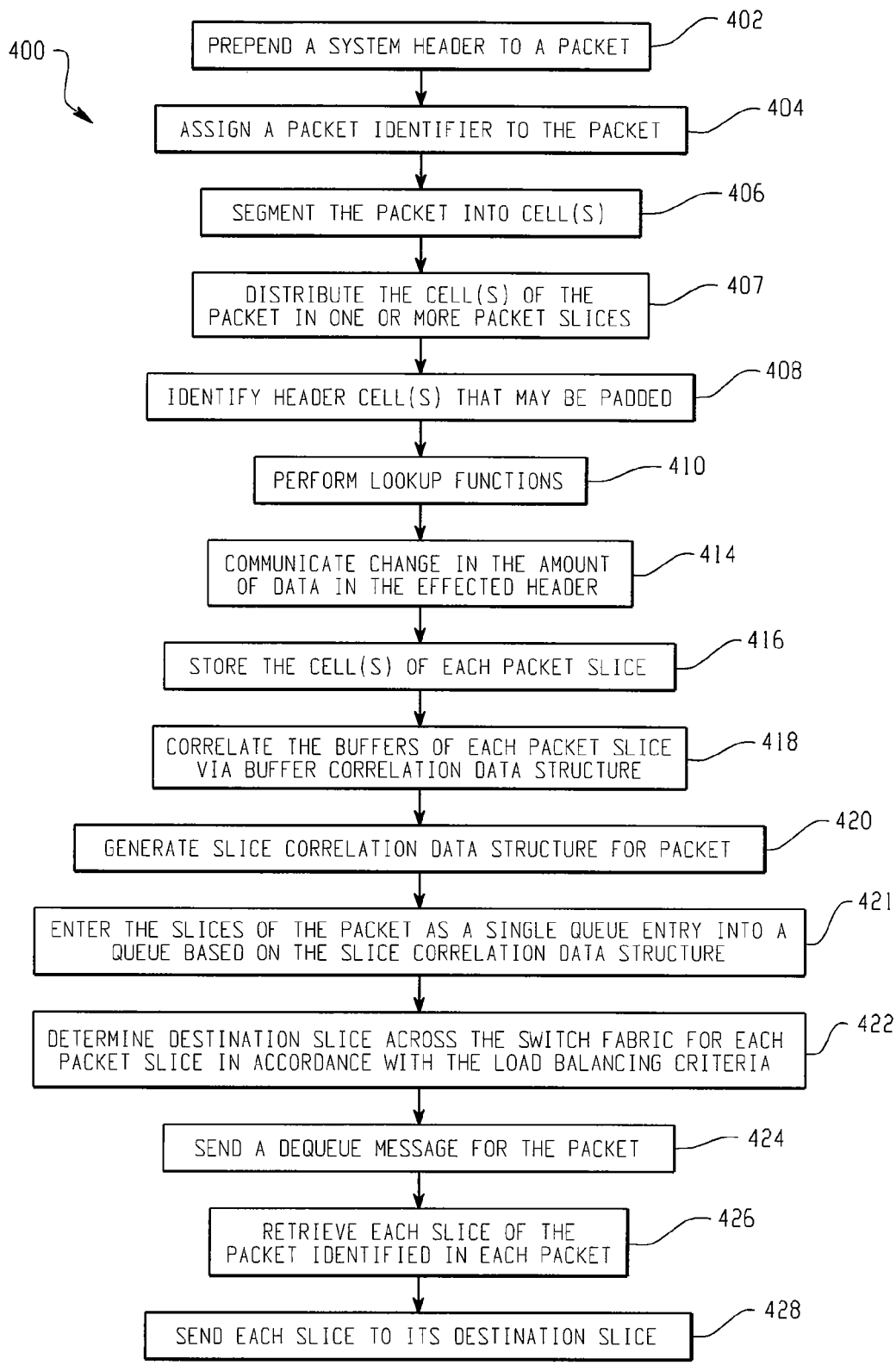
FIG. 4A illustrates a method for processing a packet in packet slices for transfer to a switch fabric in accordance with an embodiment of the present invention.
Figure 4B:
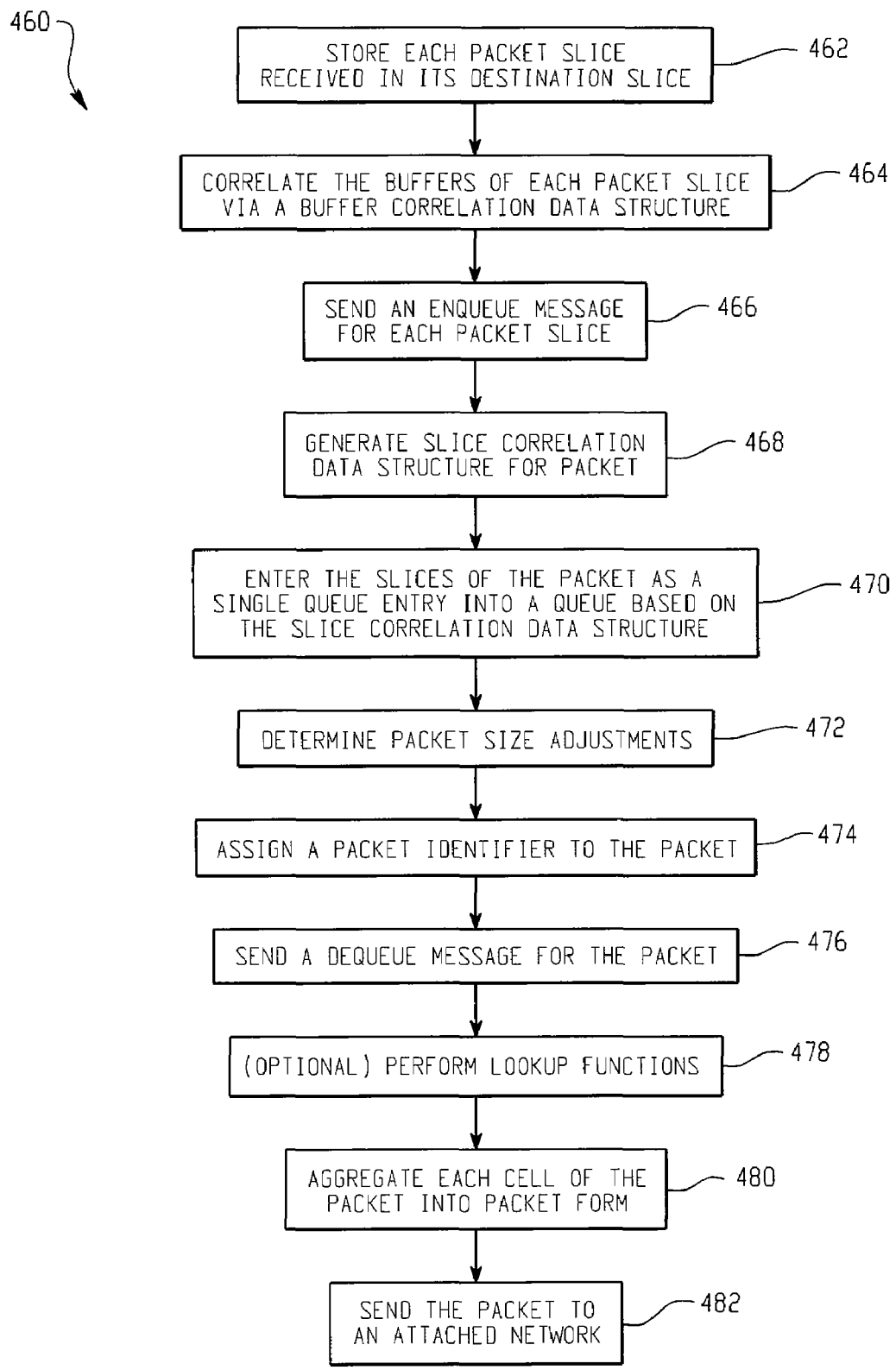
FIG. 4B illustrates a method for processing a packet in packet slices received from a switch fabric in accordance with an embodiment of the present invention.
Figure 5:
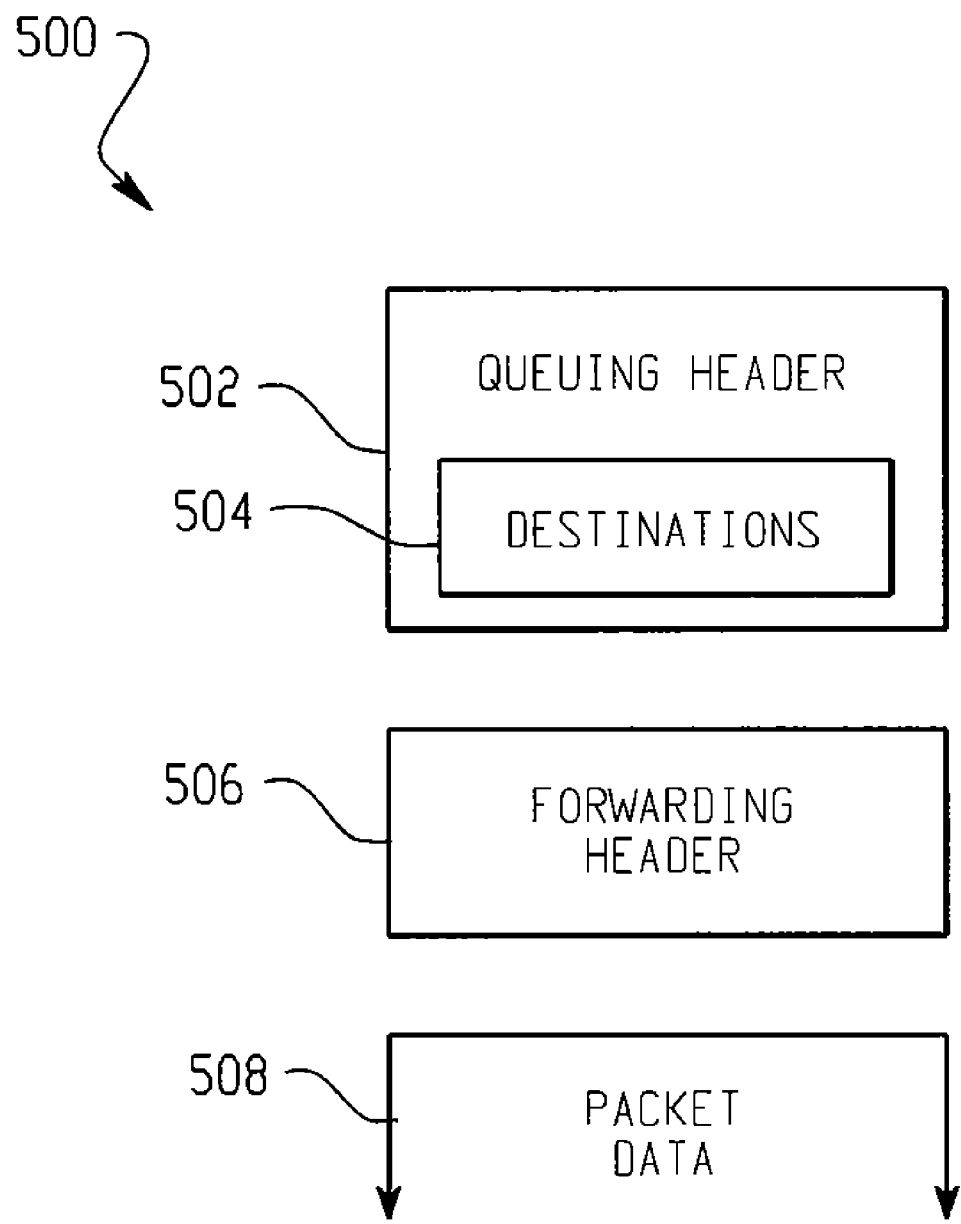
FIG. 5 illustrates one example of a system header in accordance with an embodiment of the present invention.

For illustrative purposes only, the method embodiments illustrated in FIGS. 4A and 4B are discussed in the context of the system 300 embodiment of FIG. 3. FIG. 4A illustrates a method 400 for processing a packet in packet slices for transfer to a network interface such as a switch fabric interface in accordance with an embodiment of the present invention. In the system 300 of FIG. 3, the network adaptation module 314 prepends 402 a system header to the packet. FIG. 5 illustrates one example of a system header 500 in accordance with an embodiment of the present invention. The header 500, preceding the data 508 of the original packet, comprises a queuing header 502, that may have an optional destinations portion 504, and a forwarding header 506. The queuing header (with optional destinations) precedes the forwarding header. In the system embodiment of FIG. 3, the queuing header is used by a forwarding engine $312_N$ to communicate queuing information to both the ingress and egress queue managers 308, 310 for enqueuing. Packet length information is used for load balancing considerations as well as QoS algorithms. Fields in the optional destinations portion are used to identify the packet's target queues on enqueuing. The destinations fields are used to convey other information, for example, multicast offset information, on dequeuing and retrieval. In this example, the queuing header has a destinations type field to distinguish between the type of destination information included. The forwarding header contains information that is of interest to a forwarding engine $312_N'$ in a corresponding multi-slice system 300' that will dequeue and retrieve the packet when it has egressed from the switch fabric. In this example, the forwarding header may comprises zero or one or more free-form fields to communicate forwarding information to the corresponding forwarding engine $312_N'$ processing the packet on egress. Furthermore, the forwarding header 506 comprises an indicator, referred to hereafter as cellPad, which indicates the number of bytes required to fill out the last cell of the header.

Furthermore, the network module 314 assigns 404 a packet identifier to the packet. In one example, the packet identifier is a sequence number used to identify the packet with a communication flow. The network module 314 segments 406 the packet into cells. A header for each of the cells is also generated. In system 300, in one example, the packet identifier is a part of each cell header of the packet. Examples of other descriptive information included for each cell are a channel number which indicates the destination port for the slice, for example a port of a destination line card across the switch fabric, and which may also indicate the source of the packet, e.g. the packet's receive port, a packet position indicator, a slice position indicator, an address type indicator (e.g. unicast, multicast, broadcast, anycast) and a status indicator for the cell having values examples of which are normal, buffer invalid, test cell, or master only.

The network adaptation layer module 314 distributes 407 the cells of a packet in packet slices to the forwarding engines $312_1$ to $312_N$ based upon load balancing criteria, which again, can include that load balancing is not in effect. In one example, the network adaptation layer 314 may forward the header of the packet first in the distribution. This approach requires temporary buffering space for the entire packet so that information, for example the packet byte count and cell count, can be established for the packet. In another embodiment, the cells of the body are distributed to first and the header data of the packet follows the body. The header data of the packet includes data that may be found in either the prepended system header or the original packet header.

A forwarding engine $312_N$ also identifies 408 header cells that may be padded. The last cell of the packet's header may contain fewer than a full cell's worth of valid data. In the example system of FIG. 3, a less than full last cell may be truncated within the system to no ill effect. Across a switch fabric, however, only the very last cell of a packet may be partial. Hence, a partial mid-packet cell must be padded out to the length of a full cell. In one example, the forwarding engine $312_N$ may identify a cell for padding by setting an indicator of the number of bytes to pad out the last cell, for example, cellPad in the forwarding header portion of the system header example discussed in FIG. 5. In this example, the padding indicator is set regardless of whether or not the pad bytes are actually transmitted.

Each forwarding engine performs 410 lookup functions, examples of which have been described above. For example, the forwarding engine $312_N$ determines a queue for a packet to be enqueued, and sets one or more indicators in the system header for queue identification information. In another example, the forwarding engine $312_N$ determines whether the header data of the packet needs to be edited, for example, a replacement data structure has been added to the header. The forwarding engine $312_N$ communicates 414 a change in the amount of data in the effected header. In one example, the forwarding engine $312_N$ updates the appropriate fields in the system header. If the number of cells in the header data has been modified, an indicator for the number of cells modified in the system header, hereafter referred to as cellcountdelta, is updated. This field contains the number of cells that have been added to or deleted from the packet's first buffer containing header data. This delta is important because it potentially changes the sequence in which cells are requested from the Buffer Manager for packet reassembly while in a load balancing mode of operation. Cellcountdelta indicates the number of extra cells that must be requested from the master slice. A positive value means that more cells than the nominal target cells per buffer must be requested whereas a negative value means that fewer cells need be requested. Additionally, the addition or deletion of cells effects the byte count of the packet data (exclusive of the packet header added by the system). The forwarding engine $312_N$ updates the an indicator of the number of bytes that have been added to or deleted from the packet's header data, hereafter referred to as packetLengthAdjust. In one example, the packet length in bytes is determined as follows from indicators in the system header of the packet:

PacketLength=(cellcount+cellcountdelta)*cell_size–packetLengthAdjust

Where cell_size is the nominal cell size used in one example for the system and cellcountdelta is a sign-extended twos complement number.

Another indicator in the system header, hereafter referred to as lengthDelta, indicates to the egress queue manager 310 the ingress forwarding engine's $312_N$ approximation of the number of bytes that are to be added to or subtracted from the length of the packet by an egress forwarding engine in a corresponding multi-slice system across the switch fabric. LengthDelta is applied to a table within the egress queue manager 310' in the corresponding system in order to arrive at the actual value to use in its policing and shaping calculations.

During egress traffic shaping, egress queue managers 310 makes their traffic shaping decisions based on the lengths of the packets upon transmission from the egress queues. The length of a packet as it is stored by the buffer manager 306 and as it traverses the switch fabric may be different from the length of the packet eventually transmitted out onto an attached network. For instance, a packet which is routed at layer 3 (e.g., a TCP/IP packet) has its layer 2 MAC encapsulation information stripped during the processing performed by the ingress forwarding engine $312_N$; shortening the packet by 14 bytes. If this change in length is not accounted for by the egress queue manager 310, then excess bandwidth may be allowed to be transmitted; in violation of service level agreements. The cell count and packet length adjust fields reflect the current, actual length of the packet. The length delta field conveys to the egress queue manager 310 the ingress forwarding engine's $312_N$ expectation of the packet's eventual transmit length. In addition to egress traffic shaping, the communication of the approximation of the packet's eventual transmit length may also be used in other contexts where traffic shaping decisions are made to relieve congestion with respect to an interface.

The ingress buffer manager 304 controls storing 416 of the cells of each packet slice received from a forwarding engine $312_N$. The buffer manager 304 correlates 418 the buffers of each packet slice via the buffer correlation data structure and sends an enqueue message for each slice to the ingress buffer manager 308. Based on the information in the enqueuing messages, the ingress queue manager 308 generates 420 a slice correlation data structure identifying the storage locations of the slices of the packet data. For example, based upon the packet identifier in the EnqueueMasterSlice and EnqueueSlaveSlice messages discussed above, the ingress queue manager 308 correlates several pending enqueue messages. Each of the EnqueueMasterSlice (EMS) and EngueueSlaveSlice (ESS) messages include the slice number identifying from which processing slice it was sent. The storage location of the start of the packet is provided in the EMS message by a buffer number of the first cell of the master slice of the packet. The buffer numbers of the start cells of the slave slices of the packet are also provided. Based on this information the queue manager 308 can correlate the packet with the storage locations of the packet data within the slices as the buffer correlation structures for each packet slice link the buffers of the slice to the buffer including the slice start, or master start in the case of the master slice. Assuming the discard indicator has not been asserted in any of the slice enqueue messages, the slice correlation data structure can be entered as a single queue entry. In effect, based on the slice correlation data structure, the manager 308 enters 421 the slices of the packet as a single entry into a queue, which in one example may have been identified in a destination field of the forwarding header 506.

When a reference to the packet reaches the head of a queue for servicing, the ingress queue manager 306 determines 422 the destination slice or slice across switch fabric to which the slice or slices of the enqueued packet are to be transferred in accordance with load balancing criteria. The ingress queue manger 306 dequeues the packet by sending 424 a dequeue message for the packet. Responsive to each dequeue message, the ingress buffer manager 304 retrieves 426 each slice of the packet identified and sends 428 each slice to its destination slice, which in the example of FIG. 3 is across the switch fabric 302. In the case where each processing slice has its own separate buffer manager, a queue manager would send a dequeue message for each slice.

FIG. 4B illustrates a method 460 for processing a packet in packet slices received from a network interface in accordance with an embodiment of the present invention. In the system embodiment of FIG. 3 used for illustrative purposes, a separate switch data distribution and aggregation module 202 as in FIG. 2 is not present. If such a switch module or switch adaptation layer were present, it would receive aggregated packet cells and distribute the cells to one or more destination slices based on cell descriptive information. In system 300, the egress buffer manager 306 receives the slice of cells for each processing slice over a communication interface assigned for each slice. The egress buffer manager 306 controls the storing 462 of each packet slice in its destination slice.

The egress buffer manager 306 correlates 464 the buffers of each packet slice by generating a buffer correlation data and sends 466 an enqueue message to the egress queue manager 310. Based on the information in the enqueuing message or messages, the manager 310 enqueues each packet slice by generating 468 a slice correlation data structure, for example a linked list, identifying the slices of the packet. Based on the slice correlation data structure, the manager 308 enters 470 the slices of the packet as a single entry into a queue.

When a reference to the packet reaches the head of a queue for servicing, the egress queue manager module 310 determines 472 packet size adjustments. For example, the egress manager 310 applies the length delta to a table in order to arrive at the actual value to use in policing and shaping calculations. The manager 310 assigns 474 a packet identifier to each cell of the same packet. This packet identifier may be a sequence number identifying the packet with a communication flow or channel with which the cell is associated.

The egress queue manger 306 dequeues the packet by sending 476 a dequeue message for the packet. In a push model, the message is communicated directly to the egress buffer manager 306 which in response forwards each slice stored in slice buffers 345, to 345$_N$ to its corresponding forwarding engine 312$_1$ to 312$_N$. In the pull model, the network adaptation module 314 receives the dequeue message including the buffer numbers of the master or slice start buffers of the packet, a master slice identifier, a channel number and the packet identifier, and based on information such as these examples in the dequeue message forms a packet request message, and sends the packet request and subsequent cell request messages for each cell of the packet through packet interface 307. Each forwarding engine 312$_N$ which retrieves a slice and may optionally perform 478 one or more lookup functions. For example, the forwarding engine may apply the multicast offset information in multicast address determination. In egress retrieval, the forwarding engine 312$_N$ may expand or contract the cells of a header, for example based on the cell count delta value.

The network adaptation layer 314 aggregates 480 the cells of the packet into packet form based on information in the cell headers such as for example, the packet identifier, packet position indicator, slice position indicator, and information in the system headers, for example, the packet length and cell count. Furthermore, the network adaptation layer 314 may reorder the packet among others in a communication flow responsive to the packet identifier representing the sequence of the packet within the flow. The network adaptation layer 314 sends 482 the packet to the attached network 316.

Figure 6A:
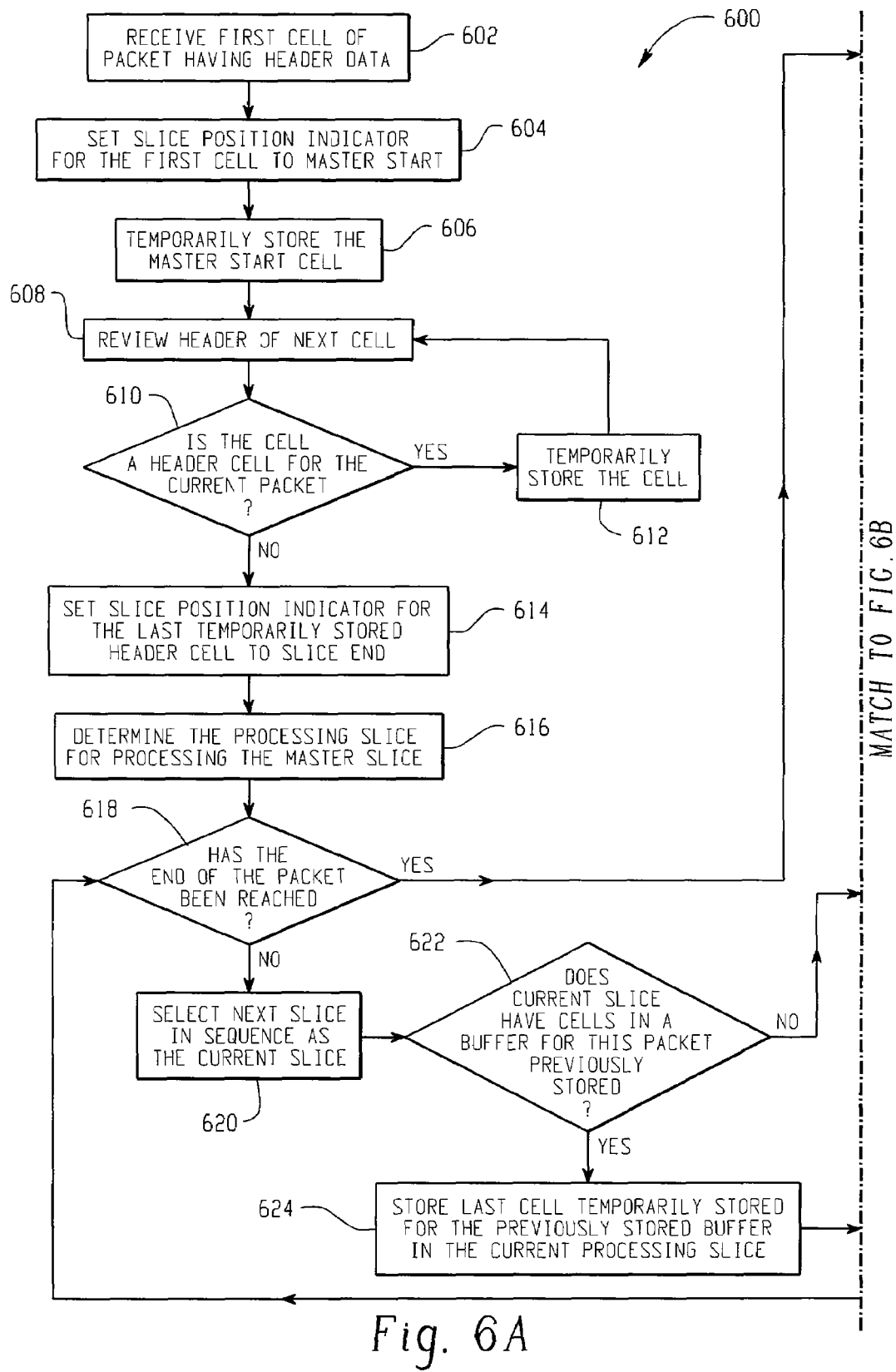
FIG. 6 illustrates a method of post-storage header delivery in a multi-slice network processor system in accordance with an embodiment of the present invention.
Figure 6B:
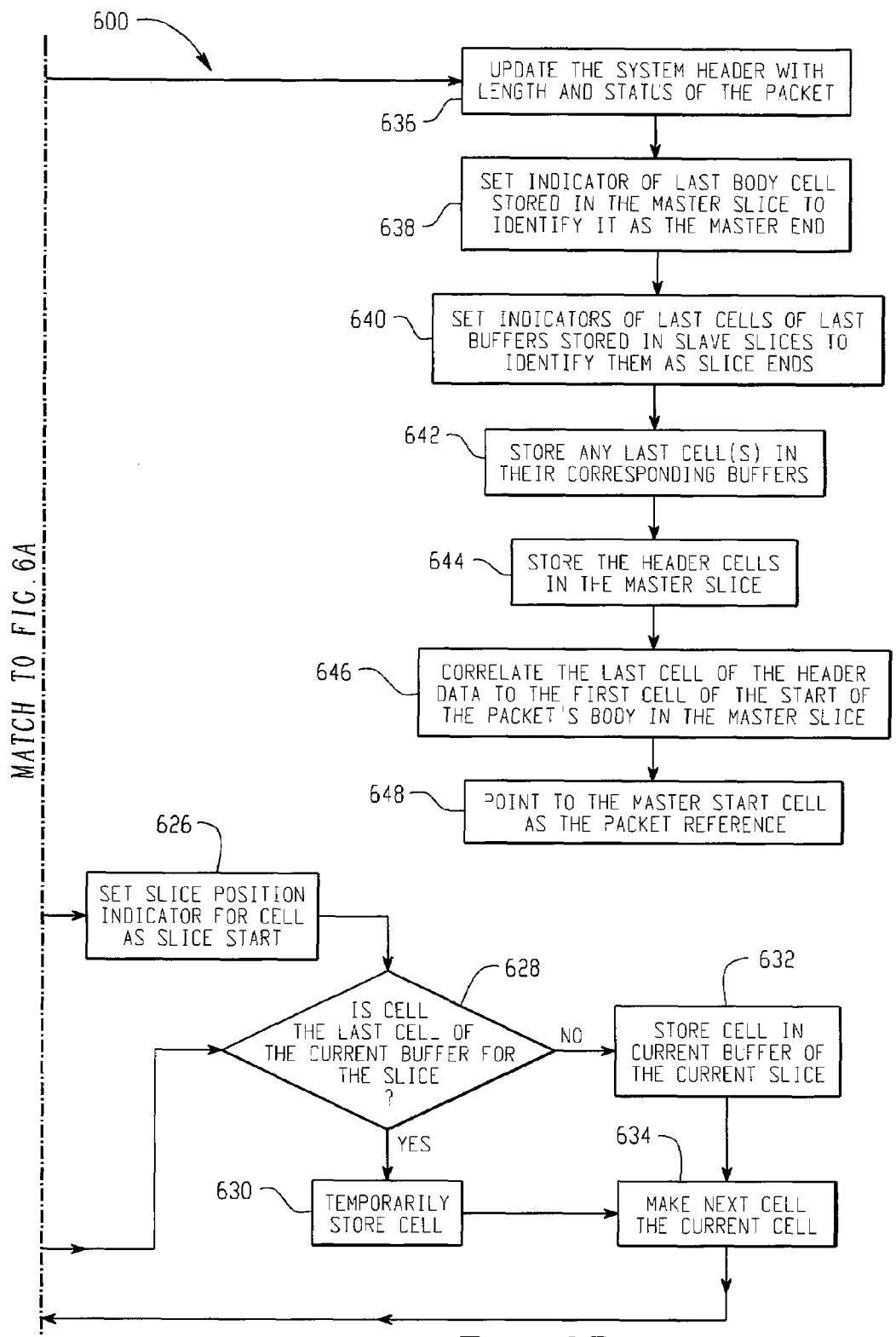
Figure 7:
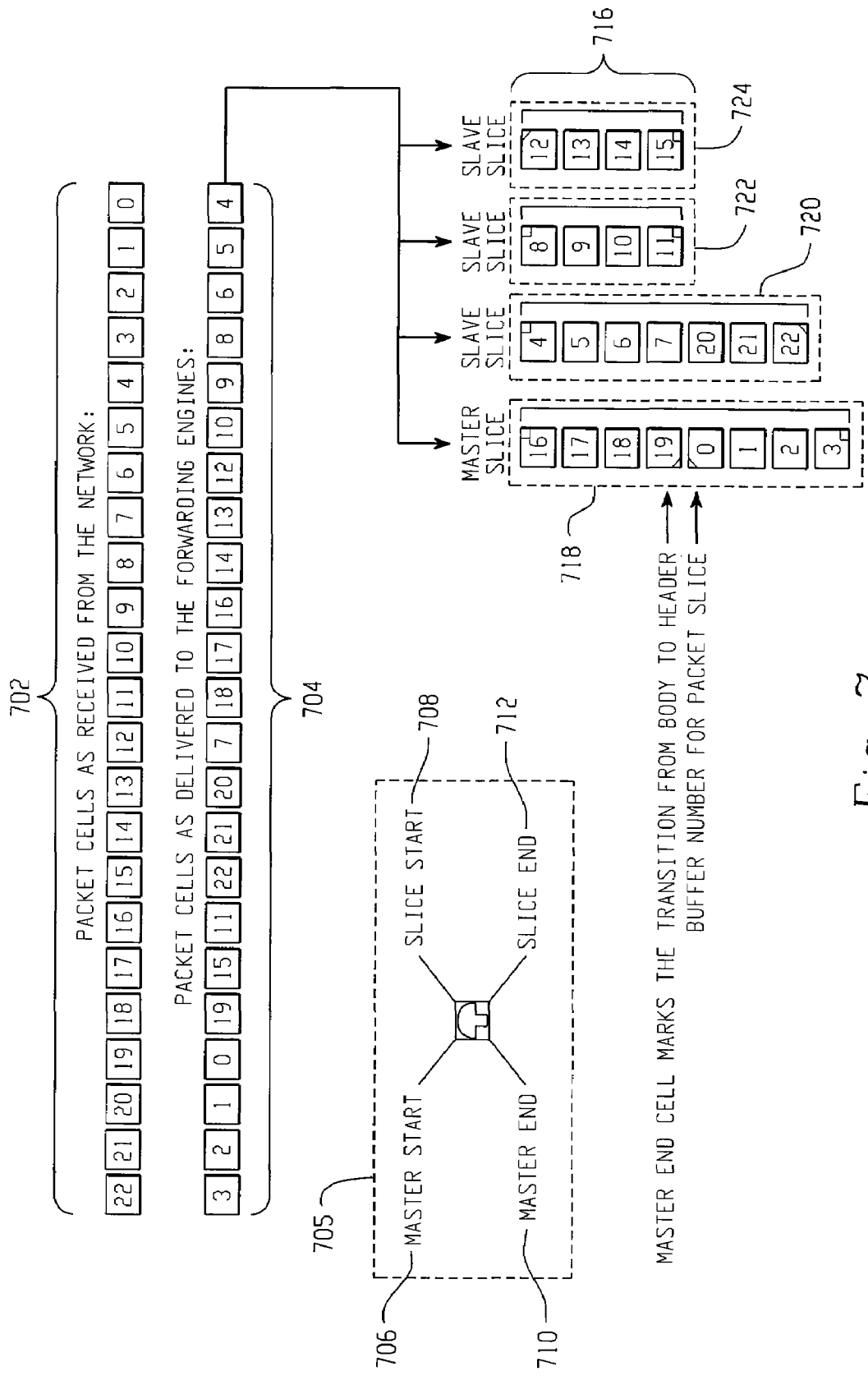
FIG. 7 provides an illustrative example of the organization of cells as stored in memory using post storage header delivery in accordance with an embodiment of the present invention.
Figure 8:
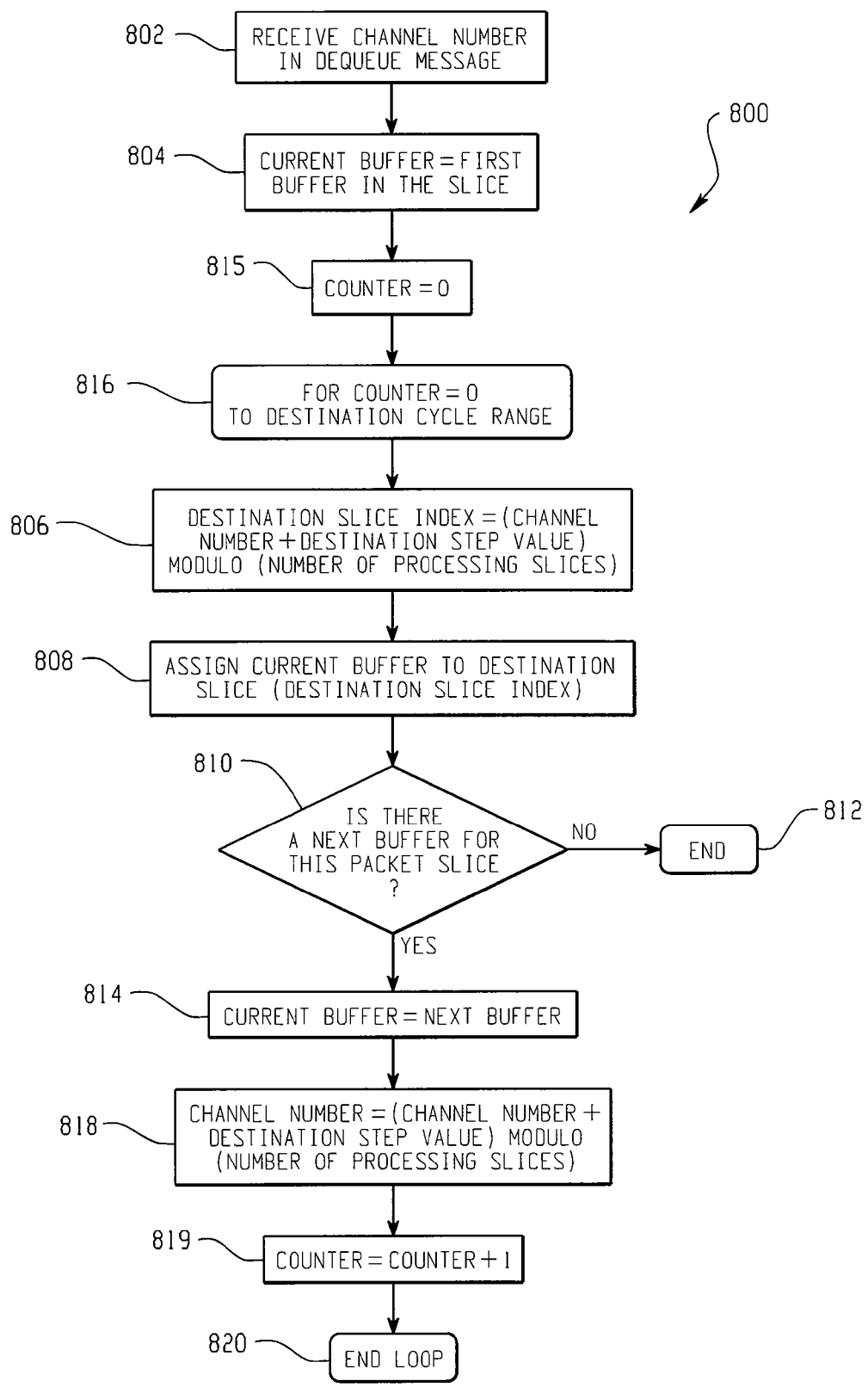
FIG. 8 illustrates a method of load balancing across a switch fabric in accordance with an embodiment of the present invention.

For illustrative purposes only, the method embodiments illustrated in FIGS. 6, 7 and 8 are discussed in the context of the system embodiment of FIG. 3.

FIG. 6 illustrates a method 600 of post-storage header delivery in a multi-slice network processor system in accordance with an embodiment of the present invention. FIG. 7 provides an illustrative example of the organization of cells as stored in memory using post storage header delivery. The legend 705 in FIG. 7 provides examples of slice position indicators for a cell. In some example, the slice position indicator also indicates a packet position such as the start of packet that a cell occupies. The master start 706 identifies the start of the first cell of a packet. The master end 710 identifies the cell of a slice that immediately precedes the first cell of a post-stored packet header. The slice start 708 is used for all slave slices and those master slices utilizing the post store of a packet's header. The slice end 712 identifies the last cell of all master and slave slices.

The header of a packet is the first portion of a packet received from the network 316. The network adaptation layer module 314 distributes the packets into cells. The network module receives 602 the first cell of a packet having header data, sets 604 the slice position indicator for this first cell to master start, and temporarily stores 606 this master start cell. The network module 314 reviews 608 the header of the next cell of packet data. It 314 determines 610 whether the cell is a header cell also for the current packet. Responsive to a positive determination, this cell is also temporarily stored 612 by module 314. However, responsive to a negative determination, the module sets 614 the slice position indicator for the last temporarily stored header cell to slice end.

In FIG. 7, the cells 702 of the packet data as received from the network begin with cells 0 through 3 which include the packet's header. In this example, four cells are the target buffer size. Cells 0 through 3 make up the packet's header buffer. As per the legend in FIG. 7, the upper left triangular marking 706 identifies cell 0 as the master start, and the lower right triangular marking 712 identifies cell 3 as a slice end. As these cells are below cells 16 to 19 in the master processing slice 718, it is evident that cells 0 through 3 were temporarily stored before being forwarded to the master slice forwarding engine 312$_N$ and buffer 343$_N$. s The network module 314 determines 616 the processing slice that will process the master slice (e.g. 718). The network module determines 620 whether the last cell processed was the end of the packet as well. Responsive to the last cell not being the end of the packet, the network module 314 selects 618 the next slice in the sequence of the distribution scheme (for example, a load balancing scheme) as the current slice. In FIG. 7, this is slice 720. The module 314 determines 622 if the current slice has cells in a previously stored buffer for this packet. If not, the slice position indicator for the cell is set 626 to slice start. Next the module 314 determines 628 whether this cell is the last cell of the current buffer being filled for this slice. If it is not the last cell, this cell is forwarded to the forwarding engine 312N of the current slice and stored 632 in the current buffer by the ingress buffer manager 304 for the current slice. The module 314 makes 634 the next cell the current cell. The module determines 620 if this cell indicates the end of the packet has been reached. If the cell is the last cell of the current buffer for the current slice, the network module 314 temporarily stores 630 the cell. The module 314 makes 634 the next cell the current cell. The module determines 620 if this cell indicates the end of the packet has been reached.

Responsive to the determination 622 indicating that cells for this packet have been stored in a previous buffer, the network module 314 retrieves the last cell of the previous buffer from temporary storage, forwards this last cell of the previous buffer to the forwarding engine 312$_N$ of the current slice, and the ingress buffer manager 304 stores 624 in the last cell in the previously stored buffer of the current slice. The network module 314 determines 628 whether the current cell is the last cell of the current buffer. The processing as discussed above is repeated depending on the outcome of the determination.

In one implementation example, the network adaptation layer module 314 temporarily buffers n−1 cells of packet data in a a first in first out (FIFO) memory structure (where n is the number of slices) in order to correctly identify all of the master and slave slice end cells.

In FIG. 7, cells 4 through 7 are grouped together into the packet's second buffer. Cells 4, 5 and 6 are forwarded to the next slice, slave slice 720, in the sequence (e.g. round robin) after the master slice. Cell 7 is held back in temporary storage within the module 314 so that the appropriate type might be applied to that cell. The storage continues with cells 8 through 11 on the next slice 722. Again, cell 11 is held back just as cell 7 was. The process continues with cells 12 through 15 in processing slave slice 724 and cells 16 through 19 in processing master slice 718. The current slice wraps around to slave slice 720 again in this example. With the reception of cell 20, it becomes clear that cell 7 is not the last cell of the current slice, so cell 7 is delivered for storage prior to the delivery of cell 20.

Responsive to the current cell being the end of the packet, the network module 314 updates 636 the system header with packet information, for example the length and status of the packet. The current cell is a last cell of a last buffer. The module 314 sets 638 the slice position indicator to master end for the last cell held in temporary storage of the last buffer of cells previously stored for the master slice. Master end indicates the transition from body cell to header cell within the master slice. The module and sets 640 indicators of the temporarily stored last cells of last buffers stored in slave or non-master slices to identify them as slice ends. Each of the last cells, including the current cell, are forwarded to their respective forwarding engines $312_1$ to $312_N$ for storage in the respective buffers in the buffer space $343_1$ to $343_N$ for their slices.

In the illustrative example of FIG. 7, upon reception of the end of packet cell, cell 22, the length and status of the packet are known and included in the prepended system header (e.g. FIG. 5) added to the packet by the system 300 within cell 0. The reception of cell 22 as the packet's last cell indicates that the other cells (cells 11, 15 and 19) held in temporary storage in the network module 314 may be indicated as slice ends and stored. In post storage of the header, the master end marks the transition from body to header. Since cell 19 is the last body cell to be stored in the master slice, it is marked as a master end cell rather than as a slice end cell as are all of the slave slice end cells. Cells 0 through 3 are delivered to the master slice with the packet's first cell marked as a master start and the last cell of the first buffer marked as a slice end.

The network module 314 stores 644 the header cells in the master slice. The first cell of the header cells is the master start and the last header cell is the slice end. The ingress buffer manager 314, correlates 646 the last cell (e.g. cell 3) of the header data, the slice end to the slice start cell (e.g. cell 16) of the master slice in a buffer correlation data structure (e.g. linked list), the data structure also correlating 648 (e.g. including a pointer to) the master start (e.g. cell 0) as the packet reference indicating the start of the packet.

Load balancing is not an essential characteristic of header post-storage. In a single slice environment, all of the body cells (cells 4 through 22 in FIG. 7) would be delivered to a single slice, followed by the header cells (cells 0 through 3).

For both load balanced and single slice systems, once the entire packet (body and header) has been stored, the ingress buffer manager 304 links the end of the header buffer (cell 3) to the start of the packet's body within the same slice (cell 16) and points to cell 0 as the start of the packet.

In a variation on the example, it is possible for the post-storage of a header to occur only in a temporal sense and for no special handling by the buffer manager to be required on the part of the master slice. This scenario occurs when a packet is long enough to trigger post-storage (more packet data than would be considered to be a part of the header portion) but too short to require the allocation of more than one buffer (group of cells) to the master slice. When these conditions are true (a 16-cell packet satisfies the criteria for the example shown in FIG. 7), the body cells are delivered to the slave slices in the normal manner ahead of the packet's header. Since cell number 15 contains the end of the packet, no body cells are delivered to the master slice. Instead, the packet's header buffer (cells 0 through 3) is delivered; bounded by master start and slice end cells as would be the case for normal packet header delivery. No peculiar handling or linking of pointers is required of the buffer manager for the master slice.

FIG. 8 illustrates a method of load balancing across a switch fabric in accordance with an embodiment of the present invention. When the bandwidth of a single network channel exceeds that of the processing and storage slices and the switch fabric interfaces, the load balancing domain may be extended across the switch fabric. Several different combinations of independent and grouped slices may communicate with one another freely through a switch fabric. FIGS. 9A, 9B, 9C, 9D, 9E and 9F illustrates examples of combinations of slices illustrated in the context of network processor system 300 embodiments in accordance with the present invention communicating with one another. These examples do not include a separate switch data distribution or aggregation module such as a switch adaptation layer module 202. Regardless of the presence of the switch module, the ingress queue manager 304 establishes load balancing patterns across the switch fabric.

For illustrative purposes only, the method embodiments illustrated in FIG. 8 is discussed in the context of the system 300 embodiment of FIG. 3. For each slice to be dequeued and transferred across the switch fabric, the ingress queue manager 308 indicates 802 in a dequeue packet message for each slice a channel number pointing to a slice of a group of destination slices for the packet. In the embodiments of FIGS. 9A through 9F, the egress buffer manager 306 maintains in a table a destination cycle range value, and a destination step value, both of which are predefined in these embodiments. In embodiments in which a separate switch data distribution and aggregation module 202 is included, the switch module 202 may maintain the table with these two values. In one example, the destination cycle range value is a bit map that enables corresponding bits in the channel number to change during a counting process. For example, the destination cycle range may $11_2$, so that a counting sequence can cycle through the indices 0 through 3 for a System with four processing slices. The destination step value determines the increment or decrement by which the counting will be done. The ingress buffer manager 304 receives 802 a channel number in a dequeue message from the ingress queue manager 308. The first buffer in the slice is made 804 the current buffer to be assigned to a destination slice. A counter is initialized 815 to zero. In this example the counter loops 816 from zero to the destination cycle range. An index of the destination slice is determined 806 by computing the sum of the channel number plus the destination step value modulo the number of destination processing slices. The current buffer is assigned 808 to the destination slice pointed to by the destination slice index. It is determined 810 whether there is a next buffer for this packet slice. If there is not another buffer for this packet, the process ends 812. If there is a next buffer, the next buffer is made 814 the current buffer. A new channel number is computed 818 by summing the channel number with the destination step value modulo the number of processing slices. The loop counter is incremented 819, and the loop continues 820 until the counter exceeds the destination cycle range, or until there are no more buffers for the packet slice in the processing slice.

Figure 9A:
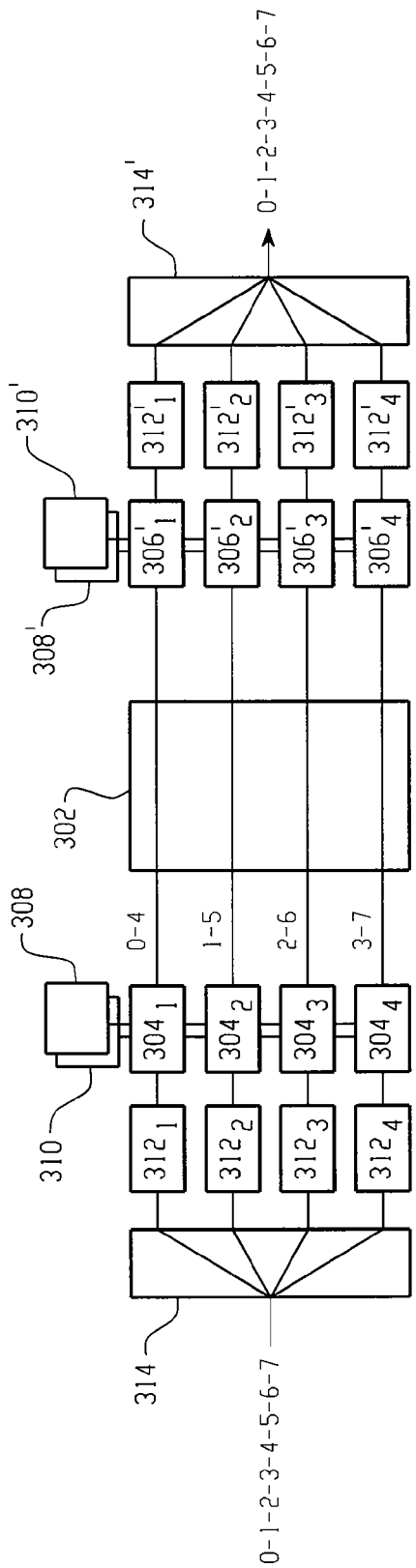
FIG. 9A illustrates an example of a configuration of a high-speed to high-speed interface across a switch fabric between two multi-slice network processor systems in accordance with an embodiment of the present invention.

FIG. 9A illustrates an example of a configuration of a high-speed to high-speed interface across a switch fabric between two multi-slice network processor systems in accordance with an embodiment of the present invention. In this example, a dequeue packet message for each ingress buffer manager $304_N{'}$ includes a different channel number value and a value of zero for the destination step value. All receive the same destination range value. FIG. 9G illustrates another version of the high-speed to high-speed interface example of FIG. 9A in which a switch adaptation layer is present in accordance with another embodiment of the present invention. The presence of the switch fabric does not effect the slice assignments.

Figure 9B:
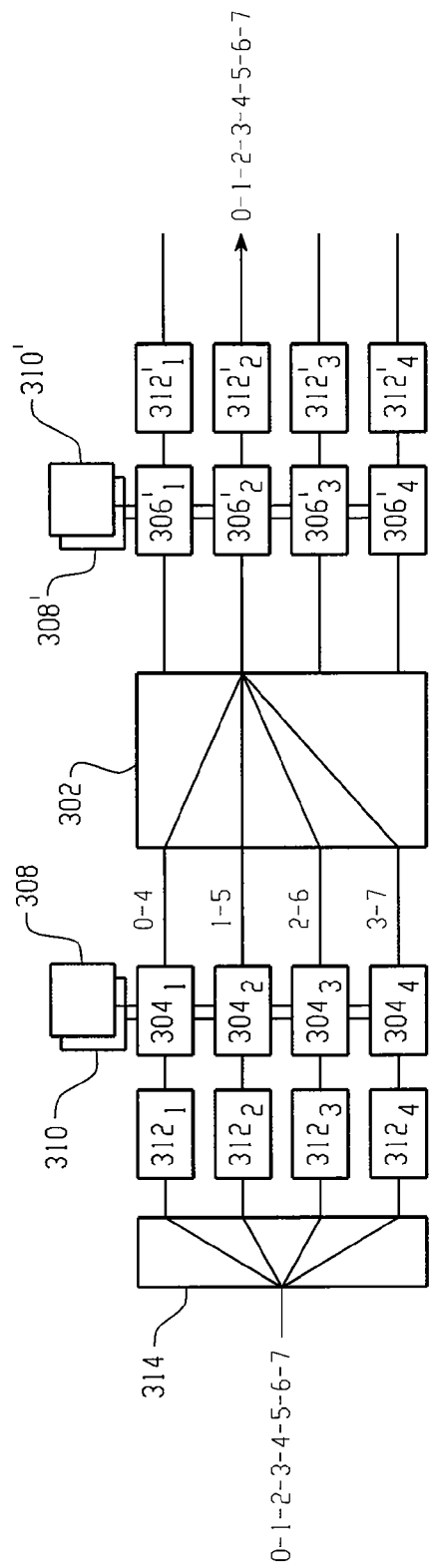
FIG. 9B illustrates an example of a configuration of a high-speed to low-speed interface across a switch fabric between two multi-slice network processor systems in accordance with an embodiment of the present invention.

FIG. 9B illustrates an example of a configuration of a high-speed to low-speed interface across a switch fabric between two multi-slice network processor systems in accordance with an embodiment of the present invention. In this example, the channel number, destination range and destination step value are the same in each of the dequeue messages the ingress queue manager 308 sends to the ingress buffer managers 304N.

Figure 9C:
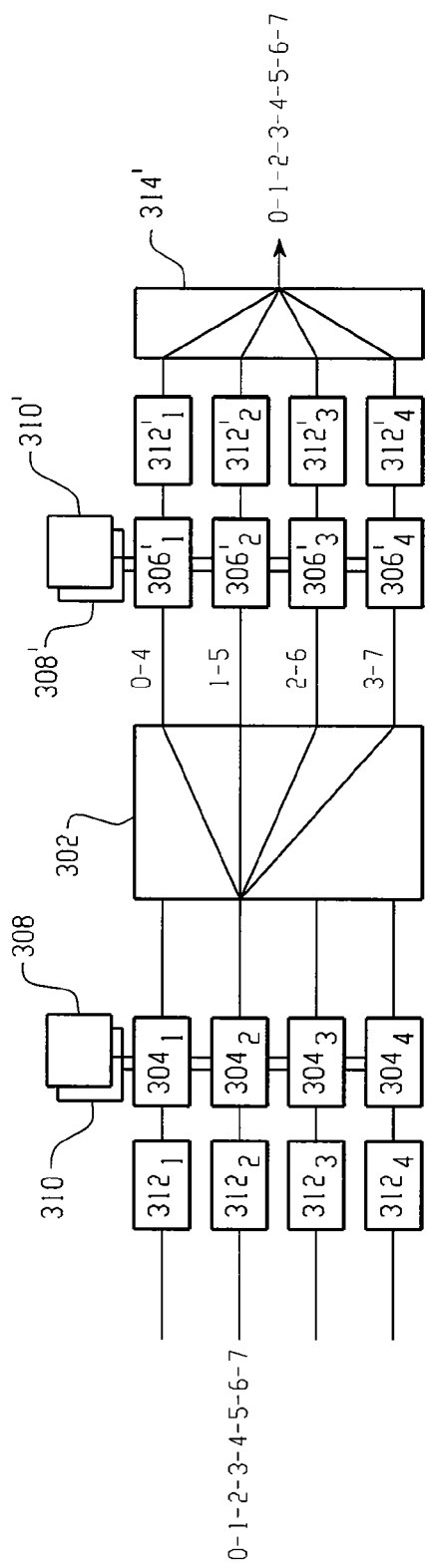
FIG. 9C illustrates an example of a configuration of a low-speed to high-speed interface across a switch fabric between two multi-slice network processor systems in accordance with an embodiment of the present invention.

FIG. 9C illustrates an example of a configuration of a low-speed to high-speed interface across a switch fabric between two multi-slice network processor systems in accordance with an embodiment of the present invention. In this example, the ingress queue manager 308 sends a single dequeue packet message with a single buffer number to the ingress buffer manager $304_2$ holding the packet which is to be load balanced across the four slices. The channel number is that of the destination slice for the master slice (start of packet slice). The destination range value allows counting through a range of 0 through 3 and a destination step value of 1 is used to cause the counting to be by ones.

Figure 9D:
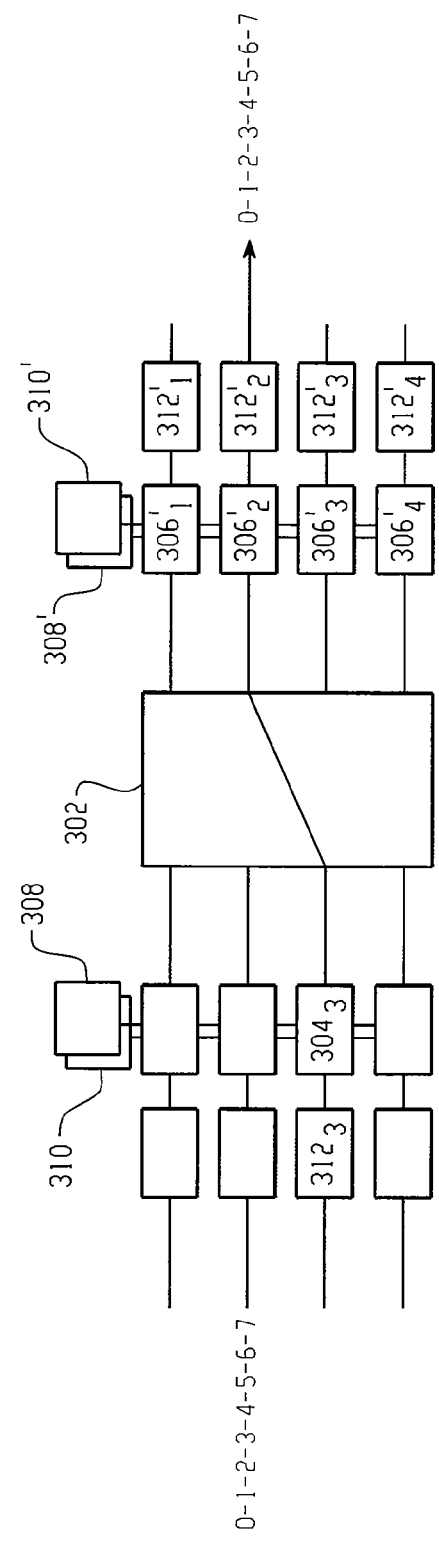
FIG. 9D illustrates an example of a configuration of a low-speed to low-speed interface across a switch fabric between two multi-slice network processor systems in accordance with an embodiment of the present invention.

FIG. 9D illustrates an example of a configuration of a low-speed to low-speed interface across a switch fabric between two multi-slice network processor systems in accordance with an embodiment of the present invention. In this case one ingress slice mapping to one egress slice. The difference in this example from the low-speed to high-speed of FIG. 9C is that the destination range value and the destination step value are zero.

FIG. 9E illustrates an example of a configuration of a medium-speed to high-speed interface across a switch fabric between two multi-slice network processor systems in accordance with an embodiment of the present invention. In this example, a packet is received and load balanced onto two slices and is then transferred across the switch fabric and is load balanced onto four slices. Each of the two ingress buffer managers must distribute its buffers to a range of egress buffer managers on the far side of the switch fabric. As in the example of one ingress slice communicating with 4 egress slices, the channel number points to the egress slice to receive the master slice. The destination range value enables counting through a range of 0 through 3, but in this example, the destination step value is 2.

FIG. 9F illustrates an example of a configuration of a high-speed to medium-speed interface across a switch fabric between two multi-slice network processor systems in accordance with an embodiment of the present invention. The example is very similar to the high-speed to low-speed example shown in FIG. 9B except that the assignments, which may be static, of destination slices are set up such that four slices point to two. In this example, ingress buffer manager $304_1$ and $304_3$ share the same channel number and ingress buffer managers $304_2$ and $304_4$ share the same channel number that is different than the channel numbers used by the other two buffer managers. FIG. 9H illustrates another version of the high-speed to medium-speed interface example of FIG. 9F in which a switch adaptation layer is present in accordance with another embodiment of the present invention. Again the presence of the switch adaptation layer does not effect the slice assignments across the switch fabric.

The addition and deletion of information from a packet changes its length. These length changes may result in the elimination or addition of packet cells to a packet. Adding a cell to a packet or deleting a cell causes the sequence in which cells are requested for retrieval to be altered. In one aspect, the present invention accounts for these changes in sequencing so as to ensure that the cells are retrieved and arranged in the proper order, resulting in the correct reassembly of the packet.

Figure 10A:
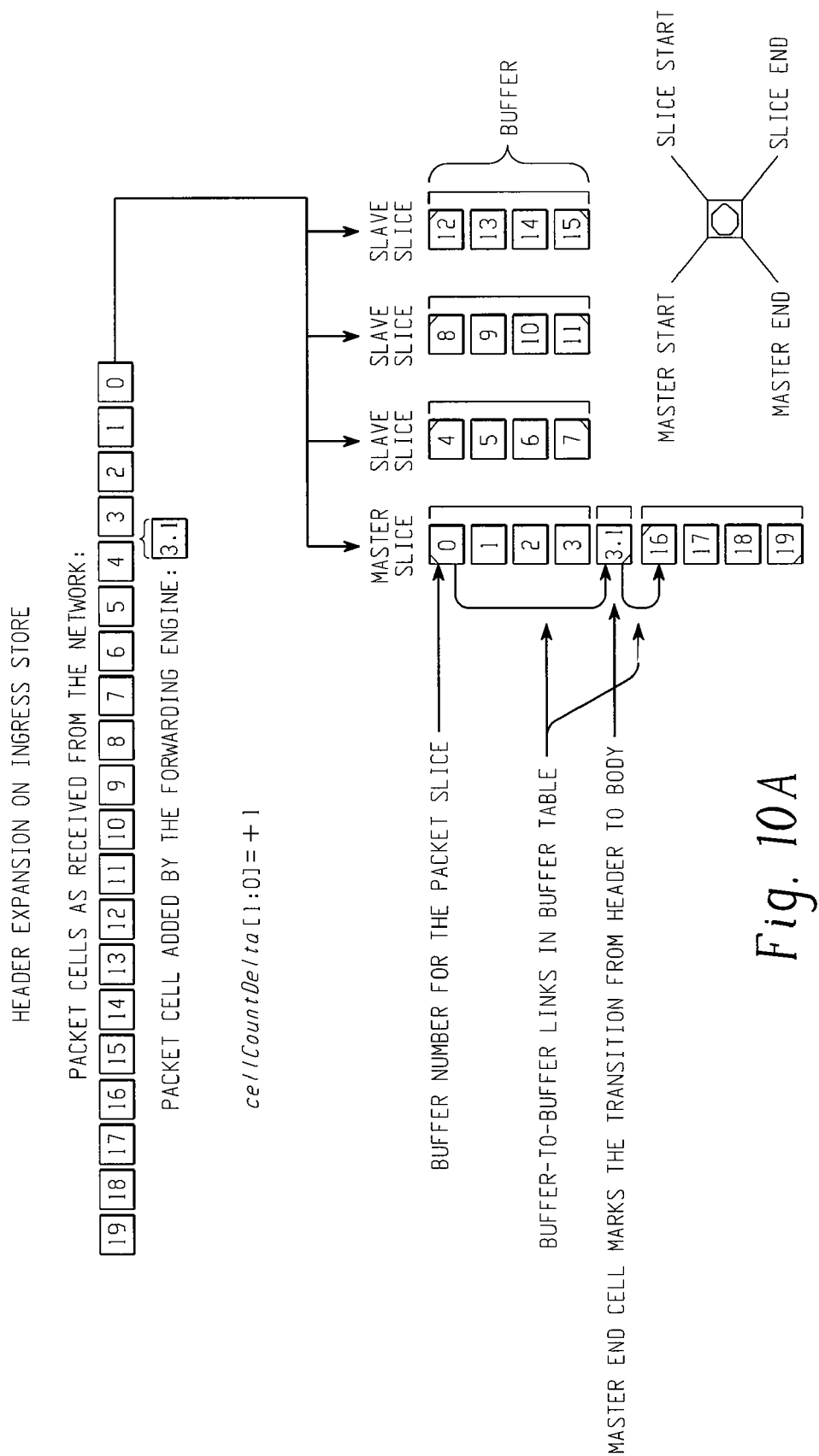
FIG. 10A illustrates an example in header expansion on ingress storage in accordance with an embodiment of the present invention.

The example in FIG. 10A illustrates header expansion on ingress storage in accordance with an embodiment of the present invention. In this example, the header is stored before the body cells, one cell is added to a packet by the lookup process. In the example of FIG. 10A, since the lookup process is confined to just one of the four processing slices involved in the handling of the packet, it may only insert any additional cells that might be required into its own sequence of cells. This results in the cell sequence shown for the master slice in FIG. 10A. Cell 3.1 has been added as part of the header data of the packet but it is in a separate buffer in this example.

For proper packet retrieval and reassembly for the present example, five cells, not four, must be retrieved from the master-slice prior to commencing retrieval from the remaining slices. For this non-standard sequence to be initiated, the retrieving process must be informed that an additional packet cell is present within the master slice. In one example, a cell count delta field is provided within certain control messages to enable this behavior. In another example, it is a field updated in the system header.

Figure 10B:
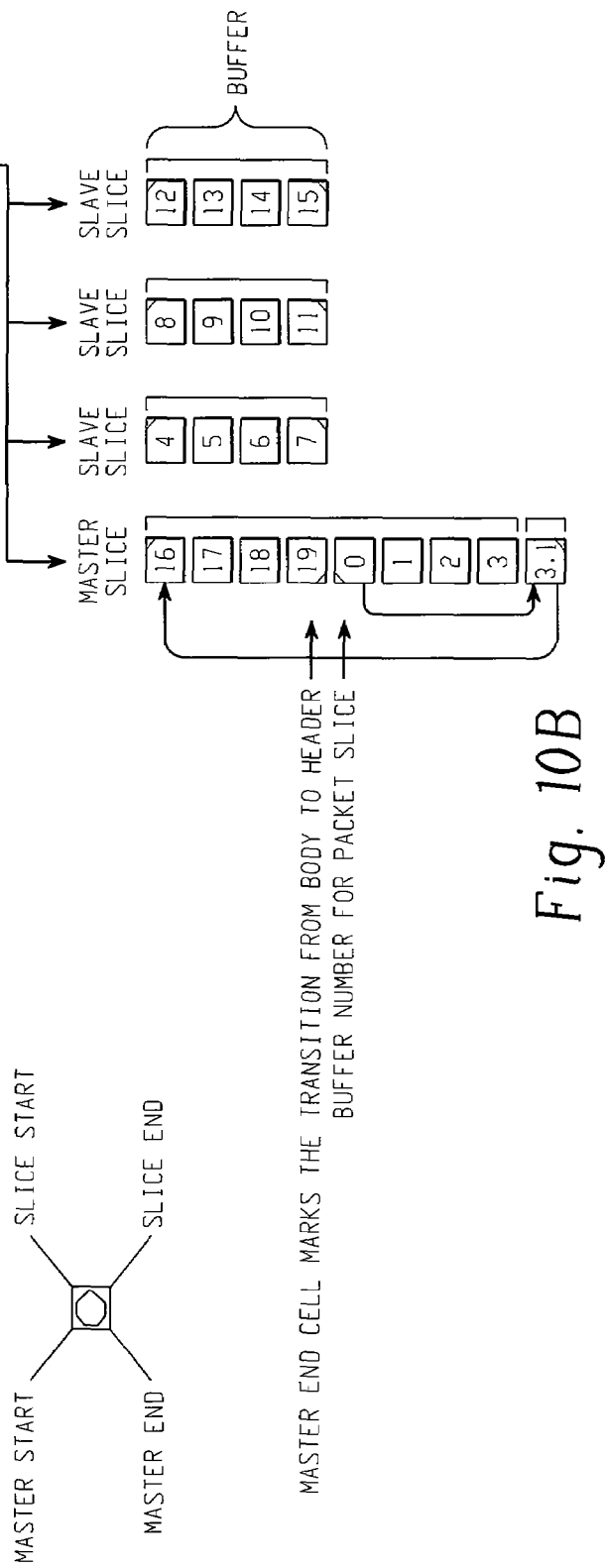
FIG. 10B illustrates an example of header expansion on ingress storage with post storage header delivery in accordance with an embodiment of the present invention.

The example of FIG. 10B illustrates header expansion on ingress storage with post storage header delivery in accordance with an embodiment of the present invention. The operational difference between this scenario and that shown in FIG. 10A is that the linking of the buffers within the master slice is handled differently. The packet's header may be delivered as either a series of cells that occupies less than a full buffer or one that requires multiple buffers. In either case, the buffer that stores the master start cell is the master start buffer for the current slice of the packet and it is that buffer's buffer number that is reported to the Queue Manager in an EnqueueMasterSlice message.

The master slice cell marked as the slice end is the last cell of the packet's header in this scenario. The buffer that contains this cell is linked to the slice start buffer of the same packet such that the packet's header precedes the body of the packet. In light of this, the buffer manager identifies the master end buffer that immediately preceded the storage of the master start buffer as the slice end buffer for this packet slice.

For ingress retrieval, the cell count delta value informs either the ingress buffer manager 304 or the switch module 202 in FIG. 2 that it is to request an additional cell from the master cell prior to requesting cells from a slave slice.

Figure 10C:
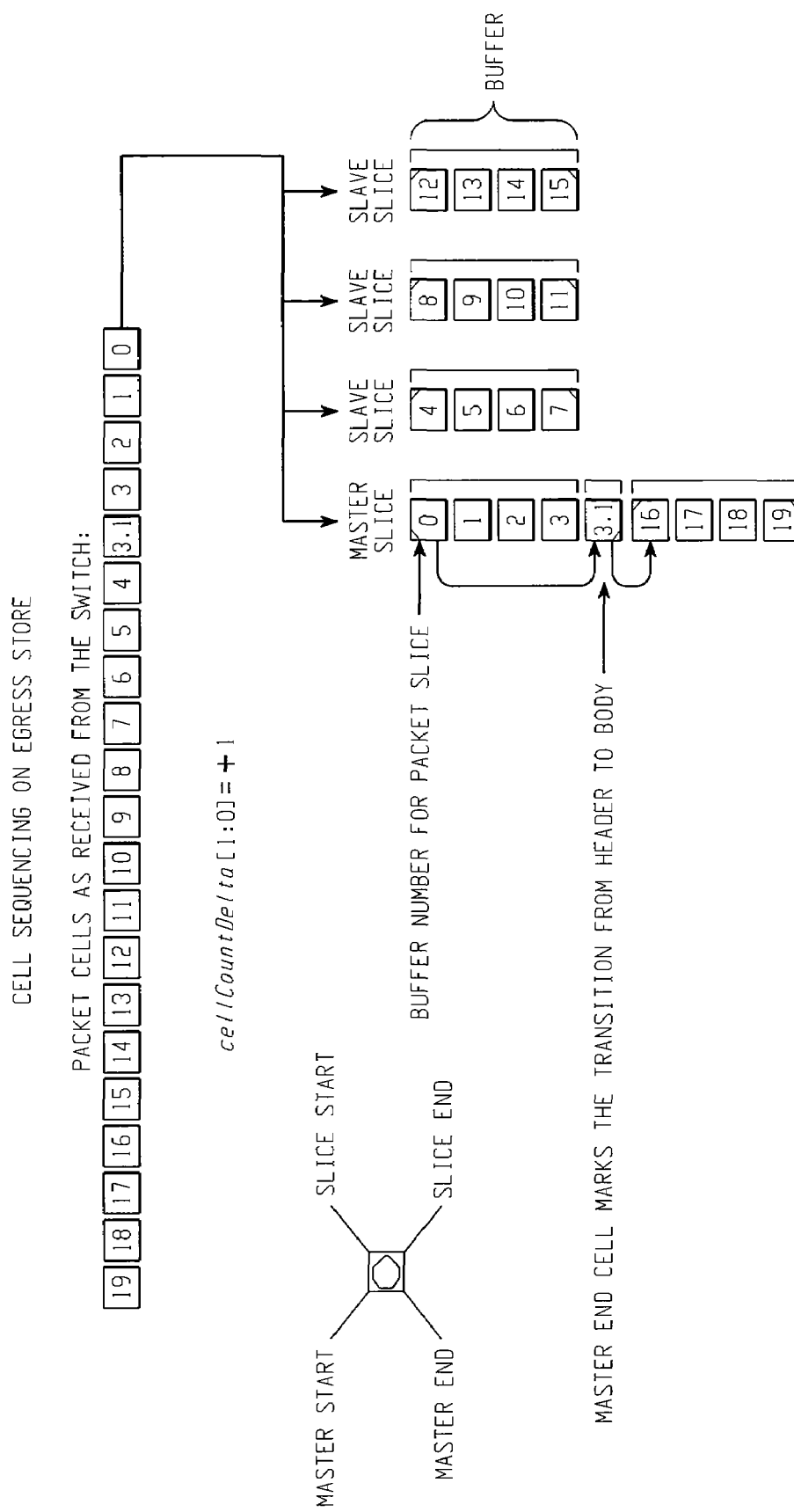
FIG. 10C illustrates an example of cell sequencing on egress storage in accordance with an embodiment of the present invention.

During egress storage, the cells that were added to (or deleted from) the packet's header during ingress storage must be accommodated. FIG. 10C illustrates an example of cell sequencing on egress storage in accordance with an embodiment of the present invention. The cells are stored in each slice as delivered from across the switch fabric. The cell count delta value is also communicated (in the packet's header) and is provided to the egress queue manager 310 as part of the enqueuing process.

Figure 10D:
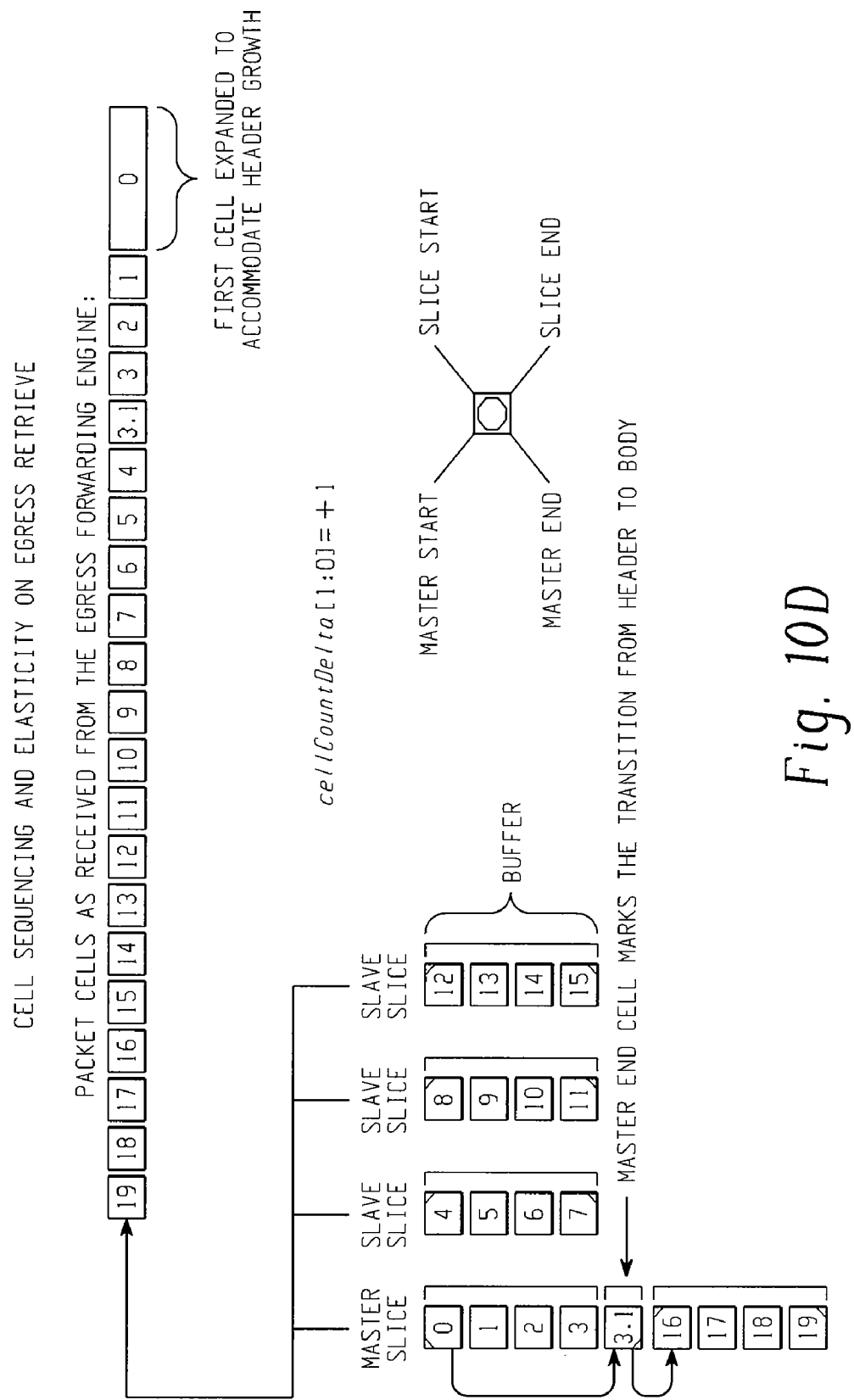
FIG. 10D illustrates an example of cell sequencing and elasticity on egress retrieval in accordance with an embodiment of the present invention.

FIG. 10D illustrates an example of cell sequencing and elasticity on egress retrieval in accordance with an embodiment of the present invention. Egress packets are retrieved from the egress buffer manager 306, through the forwarding engine 312N and to the network adaptation layer module 314. The cell count delta value affects the cell sequencing. In this example in which a pull model of retrieval is being used, an additional cell request message is issued to the master slice prior to incorporating the first cells from the neighboring slave slice.

The egress Forwarding Engine has the option of expanding or contracting the packet's header. Since the network module 314 only knows to request the retrieval of the number of cells communicated to it by the ingress process, only that number of cells is requested. Hence, the forwarding engine 312N utilizes the application of elasticity to the cells of the packet's master start buffer as illustrated in FIG. 10B in which the first cell (cell 0) is expanded to accommodate header growth.

If the header must be contracted by the forwarding engine $312_N$, then the cells are shrunk as required. It may be necessary to completely empty one or more cells if the size change of the header is significant. This is so because the number of cells that must be delivered to the network module 314 is predetermined and fixed for a particular packet and a cell is delivered for every request. The network module 314 must be able to accommodate an oversized first cell as well as partial cells.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the hereto appended claims. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. In a multi-slice network processor system comprising a plurality of processing slice modules, each module processing and storing a slice of packet data, a method for processing a packet in packet slices for transfer over a network interface comprising:
prepending a system header to the packet, the system header providing information for use by the multi-slice system, the information comprising a sequence number;
assigning a packet identifier to the packet;
segmenting data of the packet into cells, the data including both header and body data for the packet;
generating cell descriptive information for each cell, the cell descriptive information including the packet identifier, and a packet position indicator indicating an order position of data of the cell with respect to the packet;
delivering one or more cells of the packet to one or more processing slice modules based upon load balancing criteria;
storing one or more cells in a buffer in the packet slice;
generating a buffer correlation data structure correlating the buffer of the packet slice to the packet, wherein the buffer correlation data structure is a linked list of buffer identifiers;
maintaining an independent set of upper bits of a sequence number for each communication flow; and
incrementing the independent set of upper bits for the respective communication flow, concatenating the set of upper bits with a set of bits of a sequence number in the system header into an index, indexing into a re-sequencing buffer space of sufficient depth to cover a slice-to-slice skew case based on the index, and resequencing the packet into its sequence order position responsive to one of the processing slices delivering a packet having a sequence number that is smaller in value than a sequence number for an immediately preceding packet for the same slice.

2. The method of claim 1 wherein load balancing criteria includes that no load balancing is in effect.

3. The method of claim 1 wherein the packet identifier is a sequence number representing an order of the packet in a communications flow and further comprising assigning a communications flow indicator to the cell descriptive information of each cell of the packet.

4. The method of claim 1 wherein the cell descriptive information further comprises a slice position indicator indicating an order position of the data of the cell with respect to a slice of data of the packet.

5. The method of claim 4 further comprising delivering body data of the packet to one or more of the processing slices ahead of the header data of the packet.

6. The method of claim 5 further comprising:
performing lookup functions for each slice of data;
determining a size of data change in header data; and
communicating the size of data change to a queue manager via an indicator in the system header.

7. The method of claim 1 further comprising generating a slice correlation data structure for the packet including a packet reference pointing to the buffer of the packet slice including the first cell of the packet, and a respective buffer indicator for the buffer in each packet slice storing the first cell in the slice for the packet.

8. The method of claim 7 further comprising entering the slice correlation data structure as a single queue entry into a queue.

9. A multi-slice network processor system comprising:
a plurality of parallel processing slices, each processing slice comprising a lookup processing module and access to a storage sub-system, the storage sub-system including a memory, the memory storing at least one group of cells of a packet in a buffer; and a buffer manager, the buffer manager maintaining a buffer correlation data structure for correlating one or more buffers to the packet, wherein the buffer correlation data structure is a linked list of buffer identifiers, the buffer correlation data structure being stored in the memory;
a network data distribution and aggregation module for segmenting a packet received from a network into one or more packet slices, the network data distribution and aggregation module having a communication interface to each of the processing slices for communicating each packet slice;
each of the plurality of slices having a channel communication interface with the network interface over which each packet slice is directed to a destination processing slice across the network interface; and
a queuing module having an enqueuing communication interface and a de-queuing communication interface with each of the processing slices, the queuing module controlling the enqueuing and dequeuing of each of the packet slices, and determining the destination processing slice based on load balancing criteria;
wherein the queuing module is configured to maintain an independent set of upper bits of a sequence number for each communication flow;
wherein the queuing module is configured to acquire a sequence number for a packet delivered from a slice; and
wherein the queuing module is configured to increment the independent set of upper bits for a communication flow, concatenate the set of upper bits with a set of bits of the sequence number of the packet into an index, index into a re-sequencing buffer space of sufficient depth to cover a slice-to-slew case based on the index, and re-sequence the packet into its sequence order position responsive to detecting one of the processing slices delivering a packet with a sequence number that is smaller in value than sequence number for a packet immediately preceding the packet for the same slice.

10. The system of claim 9 wherein load balancing criteria includes no load balancing.

11. The system of claim 9 wherein the network interface is a switch fabric, and wherein each channel communication interface comprises a port connection with the switch fabric.

12. The system of claim 9 wherein the queuing module includes a queuing memory space, the queuing module maintaining a slice correlation data structure for correlating one or more slices of the same packet slice in a single queue entry, the slice correlation data structure being stored in the queuing memory space.

13. The system of claim 9 wherein the buffer manager comprises an ingress buffer manager including an ingress buffer memory space for each processing slice, the ingress buffer memory space for storing cells received from the respective processing slice, and an egress buffer memory space for each processing slice, the egress buffer memory space for storing cells received from the switch fabric for each respective processing

* * * * *